US012560713B2

(12) United States Patent
Pendergraft et al.

(10) Patent No.: US 12,560,713 B2
(45) Date of Patent: Feb. 24, 2026

(54) SONAR TILT ANGLE CONTROL STEERING DEVICE

(71) Applicant: NAVICO, INC., Tulsa, OK (US)

(72) Inventors: Dustyn P. Pendergraft, Claremore, OK (US); Christopher D. Crawford, Bixby, OK (US); Jayme Caspall, Tulsa, OK (US)

(73) Assignee: NAVICO, INC., Tulsa, OK (US)

( * ) Notice: Subject to any disclaimer, the term of this patent is extended or adjusted under 35 U.S.C. 154(b) by 152 days.

(21) Appl. No.: 17/405,067

(22) Filed: Aug. 18, 2021

(65) Prior Publication Data

US 2022/0373676 A1 Nov. 24, 2022

Related U.S. Application Data

(63) Continuation-in-part of application No. 17/326,409, filed on May 21, 2021, now Pat. No. 12,282,121.

(51) Int. Cl.
| | |
|---|---|
| *G01S 15/89* | (2006.01) |
| *G01S 7/521* | (2006.01) |
| *G01S 15/96* | (2006.01) |

(52) U.S. Cl.
CPC .............. *G01S 15/89* (2013.01); *G01S 7/521* (2013.01); *G01S 15/96* (2013.01)

(58) Field of Classification Search
CPC .......... G01S 15/89; G01S 7/521; G01S 15/96
See application file for complete search history.

(56) References Cited

U.S. PATENT DOCUMENTS

| | | | |
|---|---|---|---|
| 2,877,733 A | 3/1959 | Harris | |
| 3,598,947 A | 8/1971 | Osborn | |
| 3,807,345 A | 4/1974 | Peterson | |
| 4,982,924 A * | 1/1991 | Havins | G10K 11/006 |
| | | | 248/295.11 |
| 5,142,497 A * | 8/1992 | Warrow | G10K 11/006 |
| | | | 367/12 |

(Continued)

FOREIGN PATENT DOCUMENTS

| | | |
|---|---|---|
| CA | 2887031 A1 | 10/2015 |
| CA | 2984303 C | 8/2022 |

(Continued)

OTHER PUBLICATIONS

"The LiveScanner with True Scan Technology;" retrieved Mar. 24, 2022 from https://www.thelivescanner.com/.

(Continued)

*Primary Examiner* — Abdallah Abulaban
(74) *Attorney, Agent, or Firm* — Nelson Mullins Riley & Scarborough LLP

(57) ABSTRACT

A sonar assembly for a watercraft, including an elongated shaft having a top end and a bottom end, and defining a bore that extends from the top end to the bottom end of the elongated shaft, a transducer assembly secured to the bottom end of the elongated shaft, an elongated member having a top end and a bottom end, the elongated member being disposed within the bore of the elongated shaft, the bottom end of the elongated member being operatively connected to the transducer assembly such that movement of the elongated member with respect to the elongated shaft rotates the transducer assembly within a vertical plane with respect to the watercraft.

20 Claims, 20 Drawing Sheets

(56) References Cited

U.S. PATENT DOCUMENTS

| | | | |
|---|---|---|---|
| 5,293,351 A | 3/1994 | Noponen | |
| 5,420,828 A | 5/1995 | Geiger | |
| 5,526,765 A * | 6/1996 | Ahearn | B63B 49/00 |
| | | | 114/221 R |
| 5,892,338 A | 4/1999 | Moore et al. | |
| 6,054,831 A | 4/2000 | Moore et al. | |
| 6,181,644 B1 | 1/2001 | Gallagher | |
| 6,325,684 B1 | 12/2001 | Knight | |
| 6,447,347 B1 | 9/2002 | Steinhauser | |
| 6,504,794 B2 | 1/2003 | Haase et al. | |
| 6,507,164 B1 | 1/2003 | Healey et al. | |
| 6,524,144 B2 | 2/2003 | Pasley | |
| 6,661,742 B2 | 12/2003 | Hansen | |
| 6,678,589 B2 | 1/2004 | Robertson et al. | |
| 6,868,360 B1 | 3/2005 | Olstad et al. | |
| 6,870,794 B2 | 3/2005 | Healey | |
| 6,899,574 B1 | 5/2005 | Kalis et al. | |
| 6,902,446 B1 | 6/2005 | Healey | |
| 6,909,946 B1 | 6/2005 | Kabel et al. | |
| 6,919,704 B1 | 7/2005 | Healey | |
| 7,004,804 B2 | 2/2006 | Bernloehr et al. | |
| 7,190,636 B1 | 3/2007 | Depaola | |
| 7,195,526 B2 | 3/2007 | Bernloehr et al. | |
| 7,268,703 B1 | 9/2007 | Kabel et al. | |
| 7,303,595 B1 | 12/2007 | Janitz | |
| 7,371,218 B2 | 5/2008 | Walston et al. | |
| 7,430,461 B1 | 9/2008 | Michaels | |
| 7,452,251 B2 | 11/2008 | Boebel | |
| 7,538,511 B2 | 5/2009 | Samek | |
| D594,034 S | 6/2009 | Bernloehr et al. | |
| 7,542,376 B1 | 6/2009 | Thompson et al. | |
| 7,633,431 B1 | 12/2009 | Wey | |
| 7,722,417 B2 | 5/2010 | Bernloehr et al. | |
| 7,889,600 B2 | 2/2011 | Thompson et al. | |
| 8,106,617 B1 | 1/2012 | Holley | |
| 8,195,084 B2 | 6/2012 | Xiao | |
| 8,221,175 B2 | 7/2012 | Mynster | |
| 8,305,844 B2 | 11/2012 | DePasqua | |
| 8,645,012 B2 | 2/2014 | Salmon et al. | |
| 8,761,976 B2 | 6/2014 | Salmon et al. | |
| 8,814,129 B2 | 8/2014 | Todd et al. | |
| 8,879,359 B2 | 11/2014 | DePasqua | |
| 8,888,065 B2 | 11/2014 | Logan | |
| 8,896,480 B1 | 11/2014 | Wilson et al. | |
| 8,991,280 B2 | 3/2015 | Wireman | |
| 9,127,707 B1 | 9/2015 | Huntley | |
| 9,132,900 B2 | 9/2015 | Salmon et al. | |
| 9,135,731 B2 | 9/2015 | Lauenstein et al. | |
| 9,160,210 B2 | 10/2015 | Perry | |
| 9,162,743 B1 | 10/2015 | Grace et al. | |
| 9,201,142 B2 | 12/2015 | Antao | |
| 9,278,745 B2 | 3/2016 | Kooi, Jr. et al. | |
| 9,290,256 B1 | 3/2016 | Wireman et al. | |
| 9,296,455 B2 | 3/2016 | Bernloehr et al. | |
| 9,322,915 B2 | 4/2016 | Betts et al. | |
| 9,354,311 B2 | 5/2016 | Chen et al. | |
| 9,394,040 B2 | 7/2016 | Grace et al. | |
| 9,459,350 B2 | 10/2016 | Betts et al. | |
| 9,505,477 B2 | 11/2016 | Grace et al. | |
| 9,507,562 B2 | 11/2016 | Bailey | |
| 9,594,375 B2 | 3/2017 | Jopling | |
| 9,596,839 B2 | 3/2017 | Bailey | |
| 9,676,462 B2 | 6/2017 | Bernloehr et al. | |
| 9,746,874 B2 | 8/2017 | Johnson et al. | |
| 9,758,222 B2 | 9/2017 | Grace et al. | |
| 9,784,825 B2 | 10/2017 | Brown et al. | |
| 9,812,118 B2 | 11/2017 | Matson et al. | |
| 9,836,129 B2 | 12/2017 | Clark | |
| 9,947,309 B2 | 4/2018 | Stokes et al. | |
| 10,012,731 B2 | 7/2018 | Pelin et al. | |
| 10,025,312 B2 | 7/2018 | Langford-Wood | |
| 10,061,025 B2 | 8/2018 | Kirmani | |
| 10,107,908 B2 | 10/2018 | Betts et al. | |
| 10,114,119 B2 | 10/2018 | Horner et al. | |
| 10,114,470 B2 | 10/2018 | Clark | |
| 10,203,403 B2 | 2/2019 | Fabrizio et al. | |
| 10,241,200 B2 | 3/2019 | Sayer et al. | |
| 10,247,823 B2 | 4/2019 | Brown et al. | |
| 10,281,576 B2 | 5/2019 | Depasqua | |
| 10,310,062 B2 | 6/2019 | Coleman et al. | |
| 10,311,715 B2 | 6/2019 | Jopling | |
| 10,324,175 B2 | 6/2019 | Laster | |
| 10,325,582 B2 | 6/2019 | Antao et al. | |
| 10,451,732 B2 | 10/2019 | Laster | |
| 10,460,484 B2 | 10/2019 | Hovland et al. | |
| 10,514,451 B2 | 12/2019 | Brown et al. | |
| 10,545,226 B2 | 1/2020 | Wigh et al. | |
| 10,545,235 B2 | 1/2020 | Pelin et al. | |
| 10,684,368 B2 | 6/2020 | Pelin et al. | |
| 10,723,428 B1 | 7/2020 | Vicari et al. | |
| 10,890,660 B2 | 1/2021 | Wigh et al. | |
| 11,059,556 B2 * | 7/2021 | Ahlgren | B63H 20/32 |
| 11,061,136 B2 | 7/2021 | Abbas et al. | |
| 11,217,216 B2 | 1/2022 | Vance | |
| 11,370,516 B2 | 6/2022 | Ridl | |
| 11,525,907 B2 | 12/2022 | Wigh et al. | |
| 11,536,820 B2 | 12/2022 | Wigh et al. | |
| 2003/0191562 A1 | 10/2003 | Robertson et al. | |
| 2003/0203684 A1 | 10/2003 | Healey | |
| 2003/0214483 A1 | 11/2003 | Hammer et al. | |
| 2003/0214880 A1 | 11/2003 | Rowe | |
| 2005/0255761 A1 | 11/2005 | Bernloehr et al. | |
| 2006/0116031 A1 | 6/2006 | Bernloehr et al. | |
| 2009/0037040 A1 | 2/2009 | Salmon et al. | |
| 2009/0227158 A1 | 9/2009 | Bernloehr et al. | |
| 2012/0014220 A1 | 1/2012 | DePasqua | |
| 2012/0015566 A1 | 1/2012 | Salmon | |
| 2012/0060733 A1 | 3/2012 | Maki et al. | |
| 2012/0204467 A1 | 8/2012 | Palmer et al. | |
| 2012/0232719 A1 | 9/2012 | Salmon et al. | |
| 2012/0299764 A1 | 11/2012 | Haneda et al. | |
| 2013/0044569 A1 | 2/2013 | DePasqua | |
| 2013/0215719 A1 | 8/2013 | Betts et al. | |
| 2014/0203162 A1 | 7/2014 | Logan | |
| 2014/0249698 A1 | 9/2014 | Salmon et al. | |
| 2014/0269164 A1 | 9/2014 | Betts et al. | |
| 2014/0277851 A1 | 9/2014 | Grace et al. | |
| 2014/0336854 A1 | 11/2014 | Salmon et al. | |
| 2015/0016130 A1 | 1/2015 | Davis et al. | |
| 2015/0063059 A1 | 3/2015 | DePasqua | |
| 2015/0063060 A1 | 3/2015 | DePasqua | |
| 2015/0151824 A1 | 6/2015 | Wireman | |
| 2015/0346729 A1 | 12/2015 | Grace et al. | |
| 2016/0016651 A1 | 1/2016 | Anderson et al. | |
| 2016/0253150 A1 | 9/2016 | Williams et al. | |
| 2017/0038460 A1 | 2/2017 | Clark | |
| 2017/0285167 A1 | 10/2017 | Proctor et al. | |
| 2017/0371039 A1 | 12/2017 | Clark et al. | |
| 2018/0244361 A1 | 8/2018 | Laster | |
| 2018/0288990 A1 | 10/2018 | Laster et al. | |
| 2018/0329056 A1 | 11/2018 | Smith et al. | |
| 2018/0365246 A1 | 12/2018 | Laster et al. | |
| 2019/0064348 A1 * | 2/2019 | Clark | G01S 15/96 |
| 2019/0072951 A1 * | 3/2019 | Clark | G05D 1/0038 |
| 2019/0088239 A1 * | 3/2019 | Antao | G10K 11/006 |
| 2019/0176952 A1 | 6/2019 | Clark et al. | |
| 2019/0176953 A1 | 6/2019 | Clark et al. | |
| 2019/0219692 A1 | 7/2019 | Depasqua | |
| 2019/0265354 A1 | 8/2019 | Antao et al. | |
| 2019/0331779 A1 | 10/2019 | Sandretto | |
| 2020/0070943 A1 | 3/2020 | Clark et al. | |
| 2020/0072953 A1 | 3/2020 | Wigh et al. | |
| 2020/0103512 A1 | 4/2020 | Brown et al. | |
| 2020/0256967 A1 | 8/2020 | Wigh et al. | |
| 2020/0271782 A1 | 8/2020 | Rolt et al. | |
| 2020/0401143 A1 * | 12/2020 | Johnson | G01S 15/89 |
| 2021/0056944 A1 * | 2/2021 | Vance | G10K 11/355 |
| 2021/0141086 A1 | 5/2021 | Sloss et al. | |
| 2021/0278514 A1 | 9/2021 | Hughes | |
| 2022/0018958 A1 | 1/2022 | Wagner | |
| 2022/0108677 A1 | 4/2022 | Vance | |
| 2022/0120882 A1 | 4/2022 | Coleman et al. | |
| 2022/0381891 A1 | 12/2022 | Roland et al. | |

(56) References Cited

U.S. PATENT DOCUMENTS

FOREIGN PATENT DOCUMENTS

| | | | |
|---|---|---|---|
| CN | 109 471 116 A | 3/2019 |
| EP | 2 602 639 A1 | 6/2013 |
| EP | 1 891 461 B1 | 5/2014 |
| EP | 3170021 A1 | 5/2017 |
| EP | 3315993 A1 | 5/2018 |
| EP | 3171200 B1 | 6/2021 |
| GB | 2 421 312 A | 6/2006 |
| KR | 20180096482 A | 8/2018 |
| WO | WO 89/06368 A1 | 7/1989 |
| WO | WO 95/28682 A1 | 10/1995 |
| WO | WO 2013/126761 A1 | 8/2013 |
| WO | WO 2014/144471 A1 | 9/2014 |
| WO | WO 2016/010619 A1 | 1/2016 |
| WO | WO 2019/129068 A1 | 7/2019 |
| WO | WO 2020/114107 A1 | 6/2020 |

OTHER PUBLICATIONS

SEALOCK; "Rite-Hite Turret Livescope Mount Review;" Dec. 17, 2020; retrieved Mar. 24, 2022 from https://www.wired2fish.com/electronics/rite-hite-turret-livescope-mount-review/.

*LSMount*; retrieved Mar. 24, 2022 from https://lsmounts.com.

"Minn Kota RIPTIDE ST Foot Pedal Accessory User Manual;" retrieved Dec. 7, 2017 from file:///C:/Users/PForbes/Downloads/2377123rc_RT_ST_Foot_Pedal_Manual.pdf.; 4 pages.

"Bass Resource The Ultimate Bass Fishing Resource Guide: Bass Fishing Forums Trolling Motor Foot Pedal—Do You Mount to Deck?;" retrieved Dec. 8, 2017 from https://www.bassresource.com/bass-fishing-forums/topic/190825-trolling-motor-foot-pedal-do-you-mount-to-deck/.

Shepardson; "Google wins U.S. approval for new radar-based motion sensor;" Reuters; Jan. 1, 2019; retrieved Feb. 13, 2020 from https://www.reuters.com/article/us-google-sensor/google-wins-u-s-approval-for-radar-based-hand-motion-sensor-idUSKCN1OVISH.

Feldler; "Teaching With NYT Virtual Reality Across Subjects;" The New York Times; Mar. 28, 2019; retrieved Feb. 13, 2020 from https://www.nytimes.com/2019/03/28/learning/lesson-plans/teaching-with-nyt-virtual-reality-across-subjects.html.

Smolan et al; "The Click Effect;" New York Times VR; retrieved Feb. 13, 2020 from https://www.with.in/watch/CnVHWFg.

Porathe; "3-D Nautical Charts and Safe Navigation; Department of Innovation, Design and Product Development;" Doctoral Dissertation No. 27, Mälardalen University; Jan. 1, 2006; pp. 1-307 (XP055119720).

U.S. Appl. No. 16/791,335 entitled "Systems and Methods for Controlling Operations of Marine Vessels;" filed Feb. 14, 2020 in the name of Kristopher C. Snyder et al.

U.S. Appl. No. 17/326,409 entitled "Sonar Steering Systems and Associated Methods;" filed May 21, 2021 in the name of Christopher D. Crawford et al.

"LiveSweep (Wired or Wireless Pedal) Mounting Hardware Included;" *Cornfield Crappie Gear*; retrieved Jul. 19, 2021 from https://www.cornfieldcrappiegear.com/product-page/livesweep-wired-pedal-mounting-hardware-included.

"Google Glass;" *Wikipedia*; retrieved Apr. 18, 2013 from http://en.wikipedia.org/wiki/Google_Glass.

"Navico set to GoFree"; May 1, 2012; retrieved Apr. 18, 2013 from http://www.marinebusiness.com.au/archive/navico-set-to-gofree.

Jun. 16, 2014 Search Report and Written Opinion issued in International Patent Application No. PCT/US2014/021133.

"Motor Guide Xi5 Wireless Foot Pedal;" retrieved Dec. 7, 2017 from http://www.motorguide.com/store/accessory/xi5-wireless-foot-pedal0.

"Magic Leap Quick Start Guide;" 2018; retrieved Feb. 13, 2020 from https://assets.ctfassets.net/b173eiperqoo/4H4PJU9C0GySyie4QeuWE/c7ef230a10147e86173dd9250ce5b064/180606_QSG_277x190mm_PANTONE_v1.pdf.

*Cornfield Crappie Gear*; retrieved Jul. 19, 2021 from https://www.cornfieldcrappiegear.com/.

\* cited by examiner

650

652

674

686

672

634

687

688

676

682

660

TO SONAR
CONTROL
DEVICE

100

135°

100

101

20

SONAR TILT ANGLE CONTROL STEERING DEVICE

CROSS-REFERENCE TO RELATED APPLICATION(S)

This application claims priority to and is a continuation-in-part of U.S. Non-provisional application Ser. No. 17/326,409, entitled "Sonar Steering Systems and Associated Methods", filed May 21, 2021, which is hereby incorporated by reference in its entirety.

FIELD OF THE INVENTION

Embodiments of the present invention relate generally to marine technology and, more particularly, to marine sonar systems.

BACKGROUND OF THE INVENTION

Sonar (SOund Navigation and Ranging) systems are often used during fishing or other marine activities. Sonar systems are used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater and provide an understanding of the underwater environment. That said, further innovation with respect to the operation of sonar systems, particularly in the area of simplifying the ease of use, is desirable.

Sonar transducer elements convert electrical energy into sound or vibrations. Sonar signals are transmitted into and through the water and reflected from encountered objects (e.g., fish, bottom surface, underwater structure, etc.). The transducer elements receive the reflected sound as sonar returns and convert the sound energy into electrical energy (e.g., sonar return data). Based on the known speed of sound, it is possible to determine the distance to and/or location of the waterborne or underwater objects. The sonar return data can also be processed to be displayed on a display device, giving the user a "picture" (or image) of the underwater environment.

Although known sonar systems typically allow for the direction of transmission of sonar signals to be adjusted within a horizontal plane with respect to the watercraft to obtain the desired picture, adjustment within a vertical plane with respect to the watercraft requires that a user remove the sonar transducer elements from the water and adjust the vertical direction of transmission of the elements manually, such a re-mounting the transducer assembly. As such, there is a need for sonar systems with improved functionality regarding adjustment of the direction of transmission of the sonar system to allow a user to obtain the desired direction of transmission more rapidly.

BRIEF SUMMARY OF THE INVENTION

According to various example embodiments, a system including a sonar system and a control device is provided for simplified operations by a user.

Conventional manually controlled sonar systems include a handle that allows the user to adjust the direction of transmission within a horizontal plane relative to the associated watercraft, while the transducer array remains within the water. Similarly, conventional directionally-enabled sonar systems may include a control device that, in response to user activity, electronically controls the direction in which the transducer assembly of the sonar system is directed, but only within a horizontal plane with respect to the watercraft. In this manner, a user is able to direct the "picture" (or image) of the underwater environment to the desired location relative to the port and starboard sides of the watercraft. Various embodiments described herein are directed to both manually and electronically controlled sonar systems that allow a user to not only adjust the direction of transmission of the transducer array within a horizontal plane, but also adjust the direction of transmission vertically, e.g., either closer to or farther away from the surface of the water, while the transducer array remains submerged in the water.

One example embodiment of the present disclosure provides a sonar assembly for a watercraft including an elongated shaft having a top end and a bottom end, and defining a bore that extends from the top end to the bottom end of the elongated shaft. The assembly further includes a transducer assembly secured to the bottom end of the elongated shaft, and an elongated member having a top end and a bottom end. The elongated member is disposed within the bore of the elongated shaft, and the bottom end of the elongated member is operatively connected to the transducer assembly such that movement of the elongated member with respect to the elongated shaft rotates the transducer assembly within a vertical plane with respect to the watercraft.

In some embodiments, axial movement of the elongated member with respect to the elongated shaft rotates the transducer assembly within the vertical plane with respect to the watercraft.

In some embodiments, the sonar assembly further comprises an adjustable bracket including a base plate that is pivotably secured to the bottom end of the elongated shaft. The transducer assembly is secured to the base plate. The bottom end of the elongated member is secured to the base plate. Axial movement of the elongated member within the elongated shaft causes the base plate to pivot with respect to the elongated shaft. In some embodiments, the top end of the elongated member extends axially-outwardly beyond the top end of the elongated shaft. In some embodiments, the elongated member is one of a semi-rigid cable or a rigid rod.

In some embodiments, rotation of the elongated member with respect to the elongated shaft rotates the transducer assembly within the vertical plane with respect to the watercraft. In some embodiments, the sonar assembly further comprises an adjustable bracket including a base plate that is pivotably secured to the bottom end of the elongated shaft. The base plate has a yoke defined by two projections extending outwardly therefrom. The bracket further includes a collar defining a threaded bore. The collar is pivotably secured between the two projections defining the yoke. The bottom end of the elongated member includes a threaded portion. The threaded portion is rotatably received within the threaded bore of the collar. Rotation of the elongated member with respect to the elongated shaft causes the threaded collar to move axially along the threaded portion of the elongated member.

In some embodiments, the transducer assembly is attached to the elongated shaft such that rotation of the elongated shaft about a shaft axis causes rotation of the transducer assembly in a horizontal plane.

In some embodiments, the sonar assembly further comprises an adjustable bracket including a base plate that is pivotably secured to the bottom end of the elongated shaft. The base plate is configured to secure the transducer assembly in at least one of two different orientations. The transducer assembly is secured to the adjustable bracket such that the transducer assembly is rotatable between the two different orientations without detachment of the transducer assembly from the adjustable bracket. In some embodiments, the transducer assembly is biased to a position adjacent to the base plate. Rotation of the transducer assembly relative to the base plate between the two different orientations is prevented when the transducer assembly is in the position adjacent to the base plate. A user is able to pull the transducer assembly away from the position adjacent to the base plate to enable rotation of the transducer assembly between the two different orientations In another example embodiment of the present disclosure, an assembly for a watercraft is provided. The sonar direction control assembly includes an elongated shaft having a top end and a bottom end. The elongated shaft defines a bore that extends from the top end to the bottom end of the elongated shaft. The assembly further includes a bracket secured to the bottom end of the elongated shaft for mounting a transducer assembly thereon. The assembly further includes an elongated member having a top end and a bottom end. The elongated member is disposed within the bore of the elongated shaft. The bottom end of the elongated member is operatively connected to the base plate such that movement of the elongated member with respect to the elongated shaft rotates the base plate within a vertical plane with respect to the watercraft.

In yet another example embodiment of the present disclosure, a sonar system for use with a watercraft is provided. The system includes a sonar assembly having a transducer assembly and a directional actuator. The directional actuator is configured to rotate a direction of the transducer assembly vertically with respect to the watercraft in response to an electric signal. The system further includes a user input assembly, wherein the user input assembly is configured to detect user activity related to controlling the direction of the transducer assembly of the sonar assembly. A processor is configured to determine a direction of turn based on the user activity detected by the user input assembly, generate a turning input signal, the turning input signal being an electrical signal indicating the direction of turn, and direct the directional actuator of the sonar assembly, via the turning input signal, to rotate the direction of the transducer assembly vertically with respect to the watercraft in the direction of turn based on the turning input signal.

In some embodiments, the directional actuator is also configured to rotate the direction of the transducer assembly horizontally with respect to the watercraft in response to the electric signal.

In some embodiments, the sonar system further comprises an elongated shaft extending between the directional actuator and the transducer assembly. The elongated shaft defines a bore along its length. The sonar system further comprises an elongated member disposed within the elongated bore of the elongated member. The directional actuator is configured to rotate the direction of the transducer assembly vertically with respect to the watercraft by moving the elongated member with respect to the elongated shaft. In some embodiments, the directional actuator is configured to rotate the elongated member with respect to the elongated shaft such that the direction of the transducer assembly rotates vertically with respect to the watercraft. In some embodiments, the directional actuator is configured to move the elongated member axially with respect to the elongated shaft such that the direction of the transducer assembly rotates vertically with respect to the watercraft. In some embodiments, the directional actuator is configured to rotate the direction of the transducer assembly horizontally with respect to the watercraft by rotating the elongated shaft.

In some embodiments, the user input assembly includes a lever. The processor is further configured to determine the direction of turn based on an angle of deflection of the lever. In some embodiments, the lever comprises a foot pedal

BRIEF DESCRIPTION OF THE DRAWINGS

Figure 1:
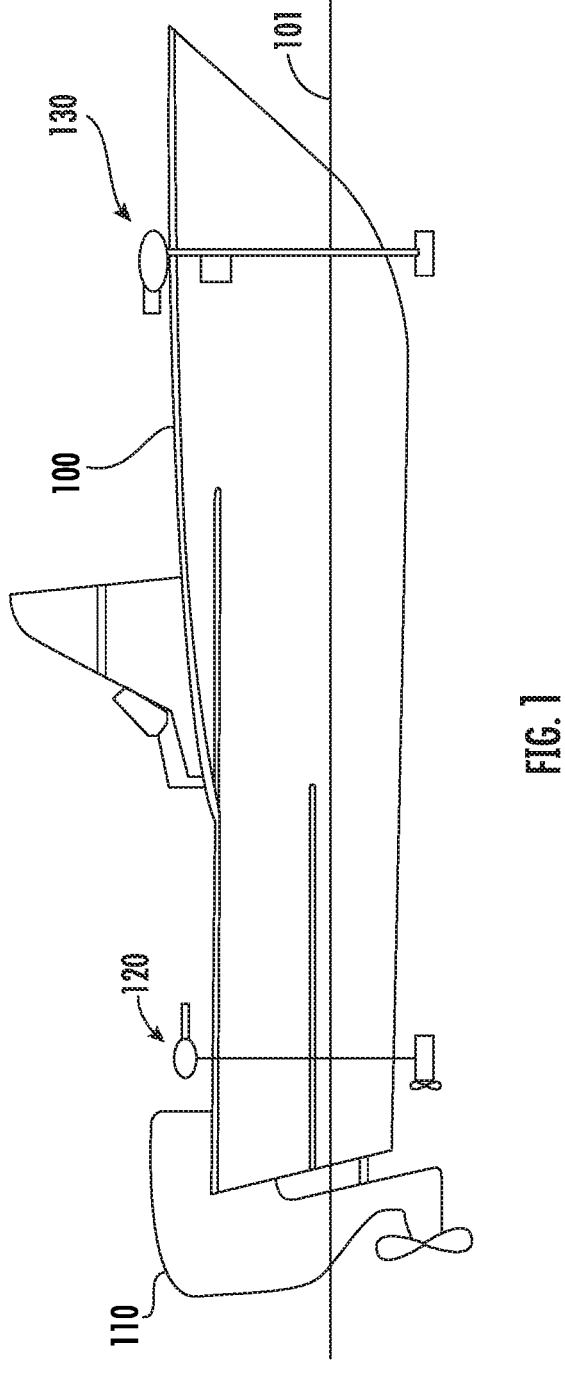
Figure 5:
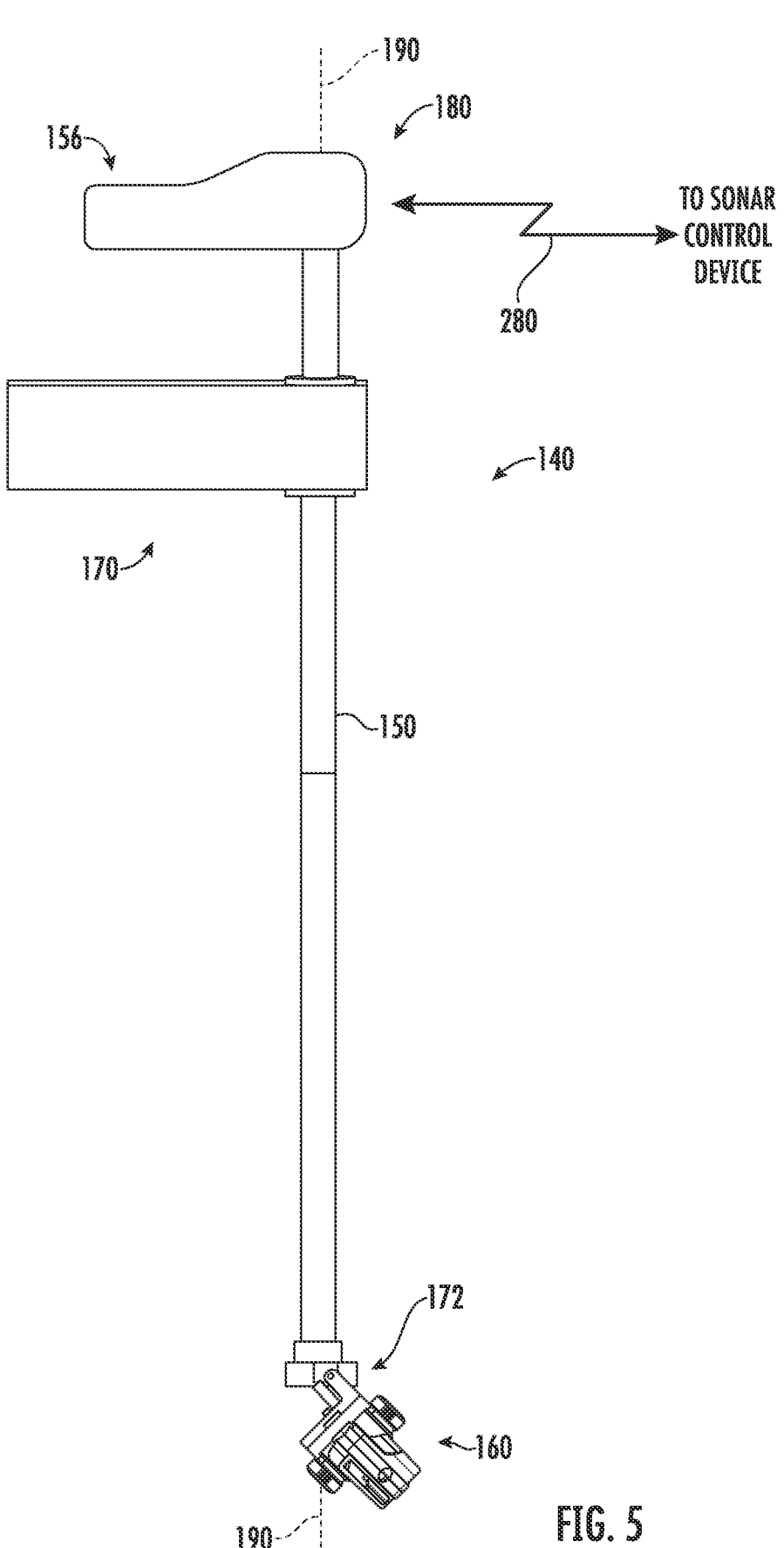
Figure 6:
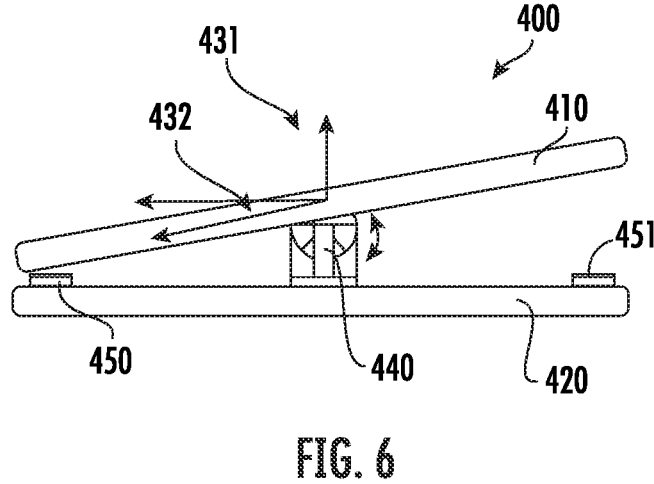
Figure 7A:
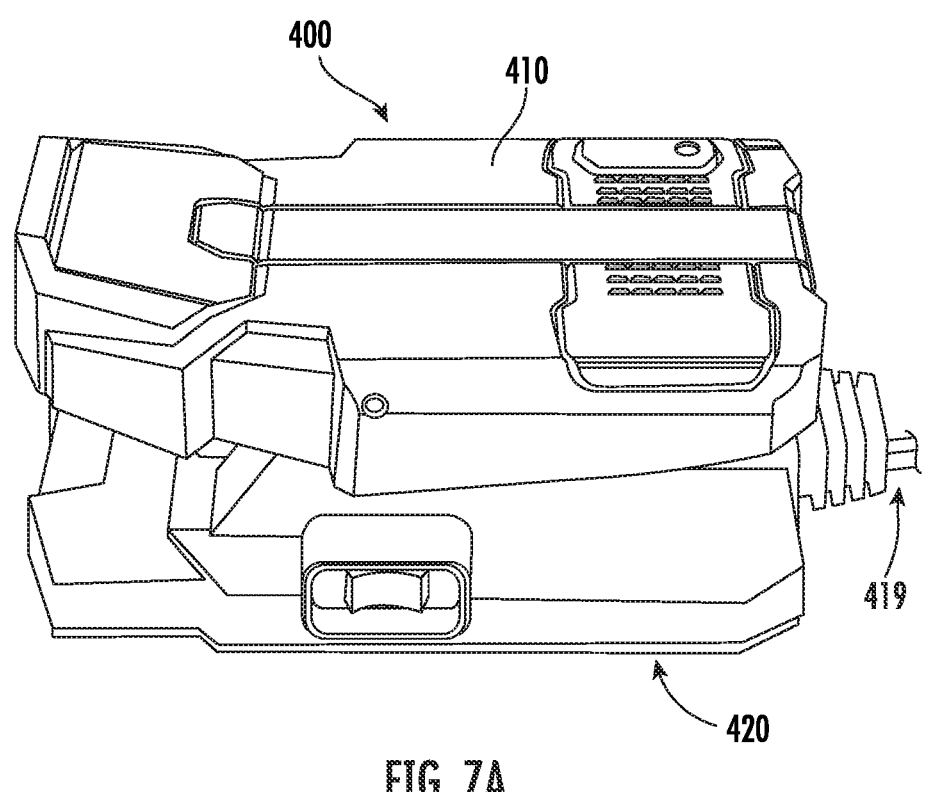
Figure 7B:
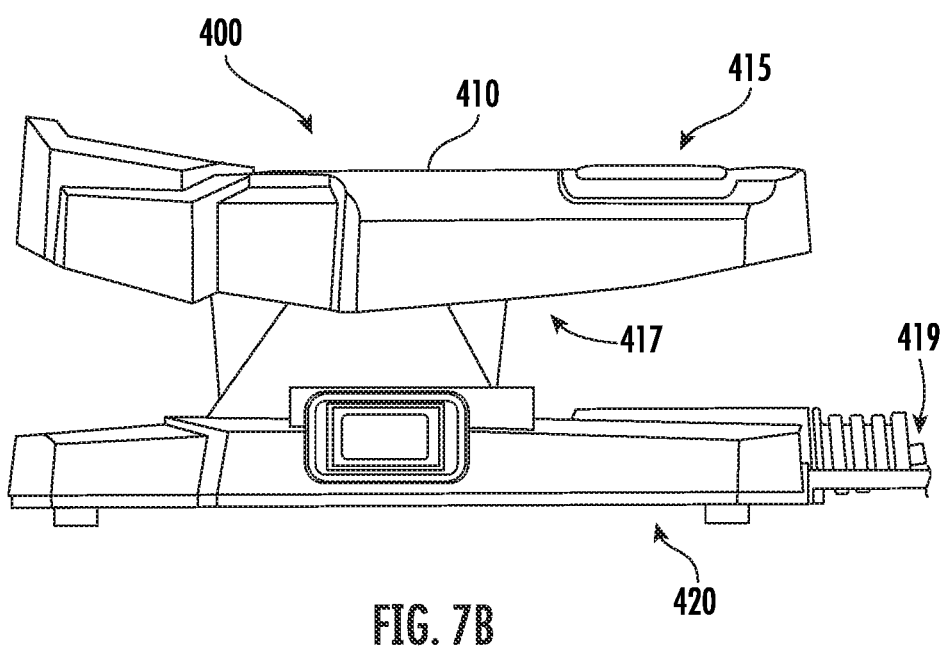
Figures 8A, 8B:
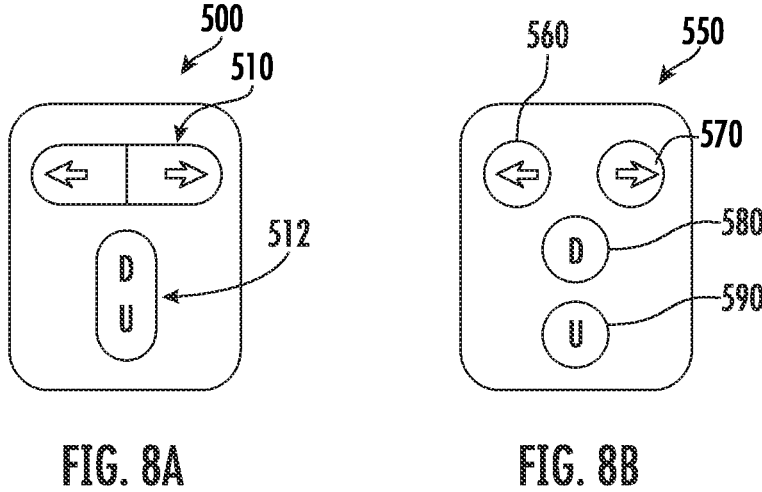
Figures 9A, 9B:
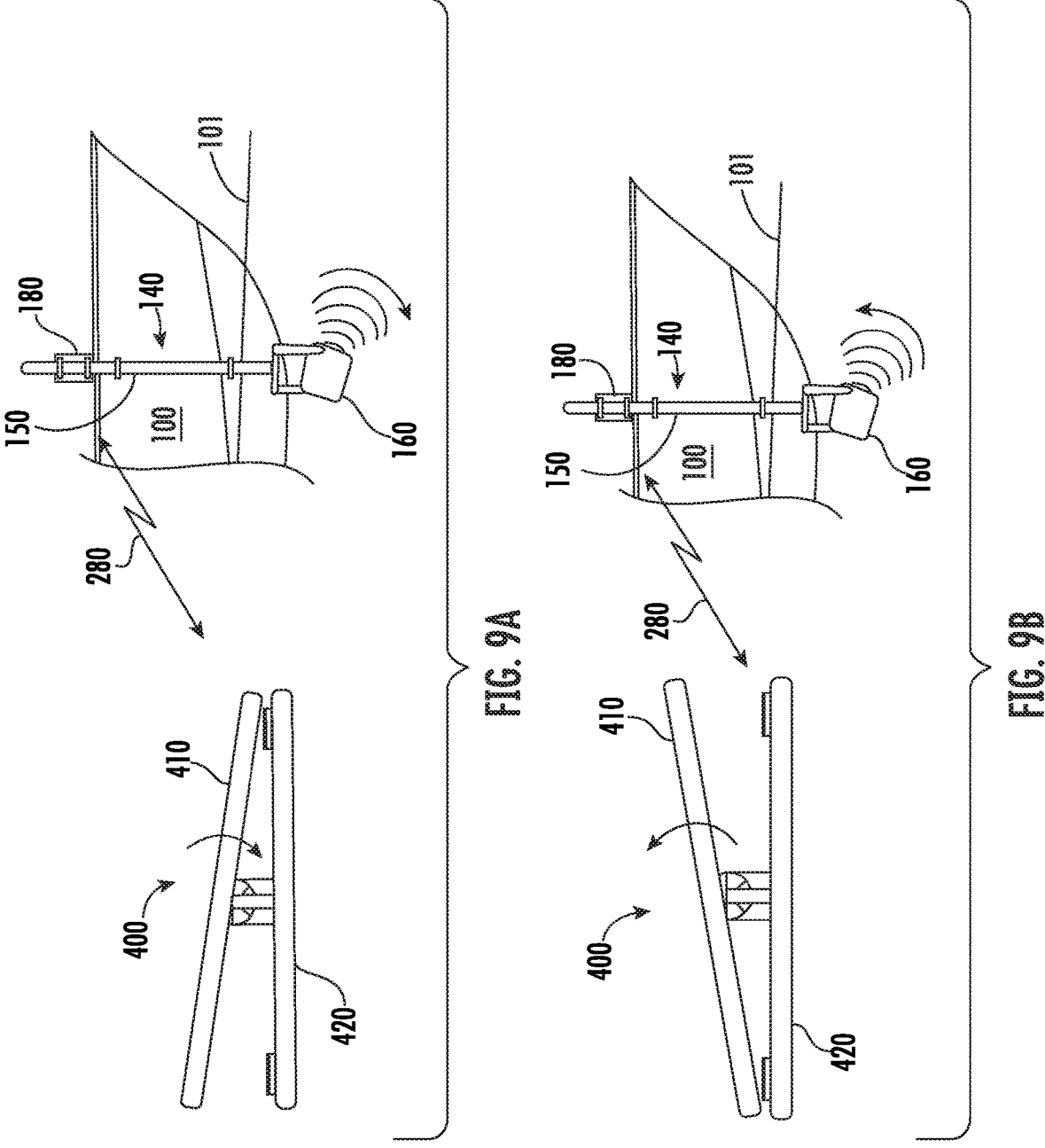
Figure 10A:
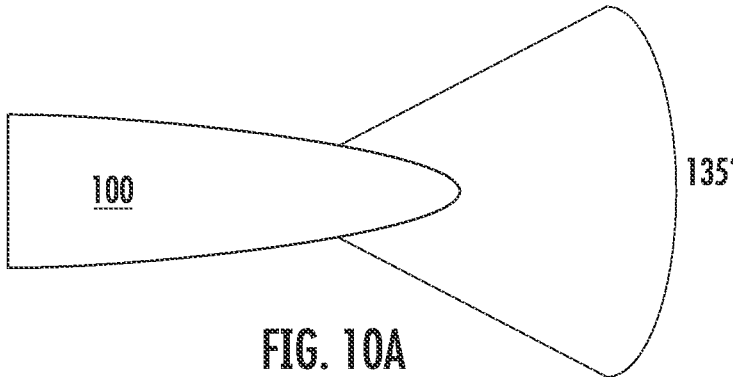
Figure 10B:
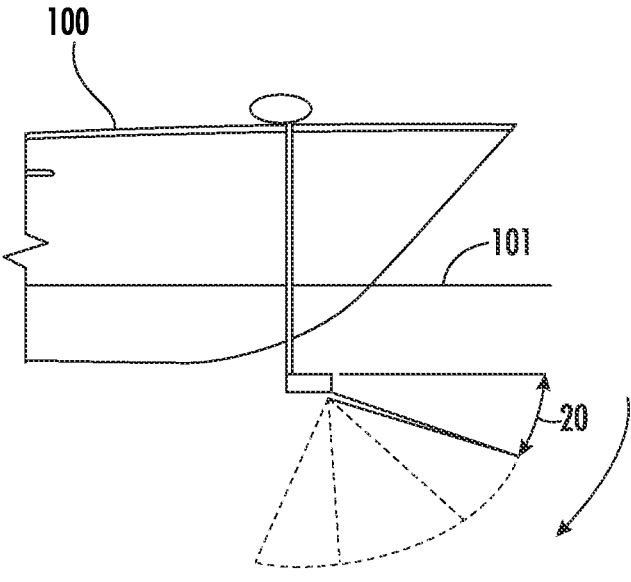
Figure 11A:
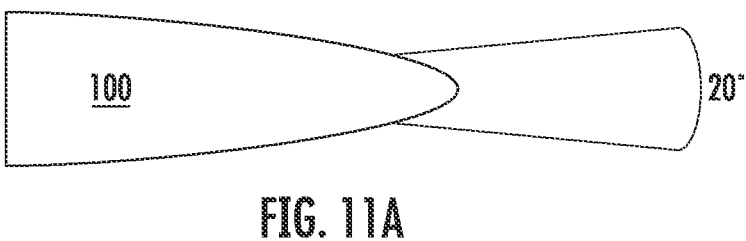
Figure 11B:
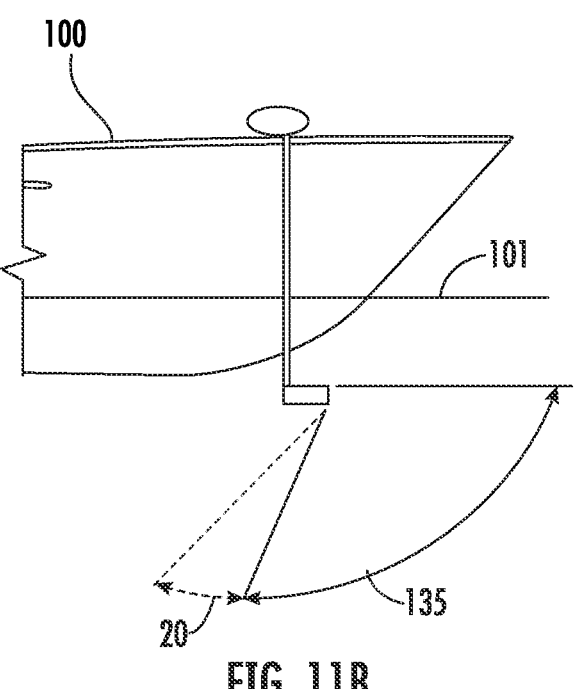
Figure 12:
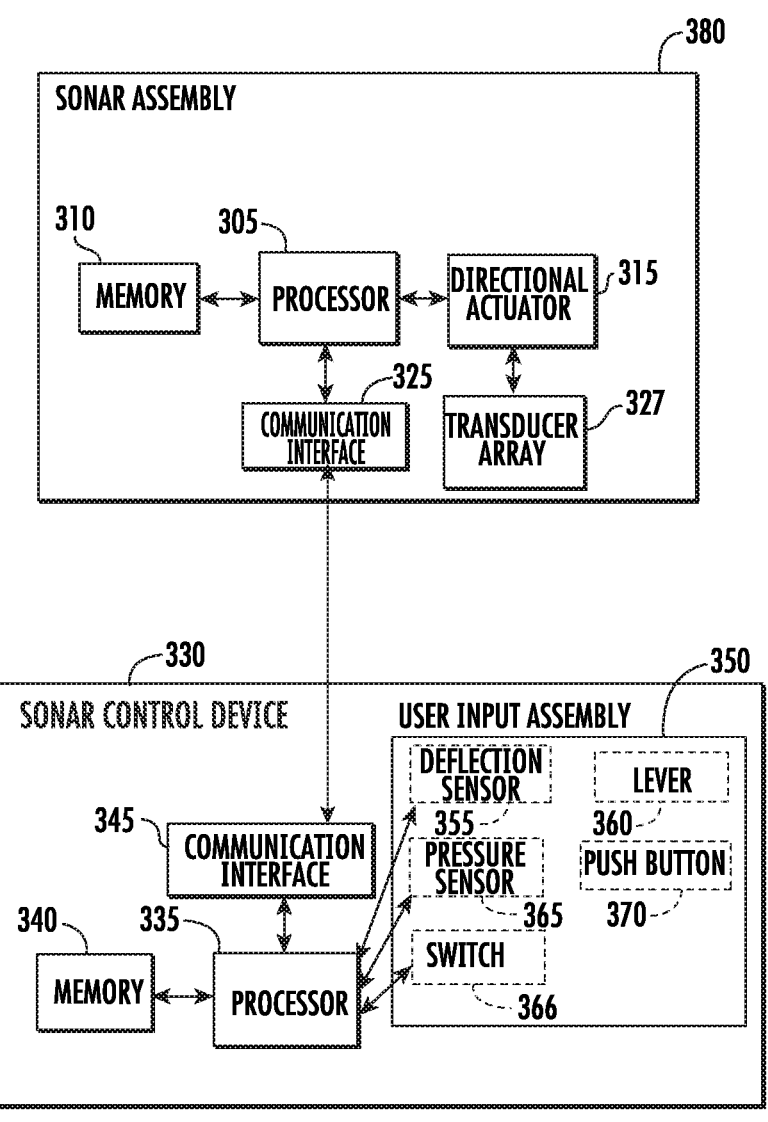

Having thus described some example embodiments in general terms, reference will now be made to the accompanying drawings, which are not necessarily drawn to scale, and wherein:

FIG. 1 shows an example watercraft with both a trolling motor assembly and a sonar assembly in accordance with some example embodiments;

FIGS. 2A through 2D show various views of an example sonar assembly in accordance with some example embodiments;

FIGS. 3A through 3D show various views of an example sonar assembly in accordance with some example embodiments;

FIGS. 4A through 4D show various views of an example sonar assembly in accordance with some example embodiments;

FIG. 5 shows an example sonar assembly in accordance with some embodiments;

FIG. 6 shows an example sonar control device in the form of a foot pedal assembly in accordance with some example embodiments;

FIGS. 7A and 7B show an example sonar control device in the form of a foot pedal assembly in accordance with some example embodiments;

FIGS. 8A and 8B show example sonar control devices in the form of fobs in accordance with some example embodiments;

FIGS. 9A and 9B show an example navigation control device in the form of a foot pedal providing control signals to an example sonar assembly attached to the bow of a watercraft;

FIGS. 10A and 10B illustrate a schematic top plan view and a schematic side plan view, respectively, of a watercraft with an example sonar assembly including a transducer assembly, wherein the transducer assembly is mounted horizontally to provide wide sonar coverage in the port-to-starboard direction in front of the watercraft, in accordance with some embodiments discussed herein;

FIGS. 11A and 11B illustrate a schematic top plan view and a schematic side plan view, respectively, of a watercraft with an example sonar assembly including a transducer assembly wherein the transducer assembly is mounted vertically to provide wide sonar coverage in the fore-to-aft direction along the watercraft, in accordance with some embodiments discussed herein; and FIG. 12 shows a block diagram of an example marine network architecture for various systems, apparatuses, and methods in accordance with some example embodiments.

DETAILED DESCRIPTION

Exemplary embodiments will be described more fully hereinafter with reference to the accompanying drawings, in which some, but not all embodiments of the invention are shown. Indeed, the embodiments take many different forms and should not be construed as being limiting. Rather, these example embodiments are provided so that this disclosure will satisfy applicable legal requirements. Like reference numerals refer to like elements throughout.

FIG. 1 illustrates an example watercraft 100 on a body of water. The watercraft 100 includes a main engine 110, a trolling motor system 120, and a sonar system 130. According to some example embodiments, the trolling motor system 120 may be comprised of a trolling motor assembly including a propulsion motor and a propeller, and a navigation control device used to control the speed and the course or direction of propulsion. The trolling motor assembly may be attached to the stern of the watercraft 100 and the motor and propeller may be submerged in the body of water below its surface 101. However, positioning of trolling motor system 120 need not be limited to the stern, and may be placed elsewhere on a watercraft. The trolling motor system 120 can be used to propel the watercraft 100 under certain circumstances, such as, when fishing and/or when wanting to remain in a particular location.

According to some example embodiments, the sonar system 130 may be comprised of a sonar assembly including a transducer assembly and manually-operated controls that may be used to control the direction of transmission of the sonar system 130. In alternate embodiments, a directional actuator and an electrical sonar control device may be used to control the sonar system 130, as discussed in greater detail below. The sonar system 130 may be placed on the watercraft, such as directly to the bow, stern, or side, such that the transducer assembly 160 is submerged in the body of water below its surface 101. Additionally, the sonar system 130 may also be attached to the trolling motor system 130. The sonar system 130 can be used to detect waterborne or underwater objects. For example, the sonar system 130 may be used to determine and/or illustrate depth and bottom topography, detect fish, etc.

Figure 2A:
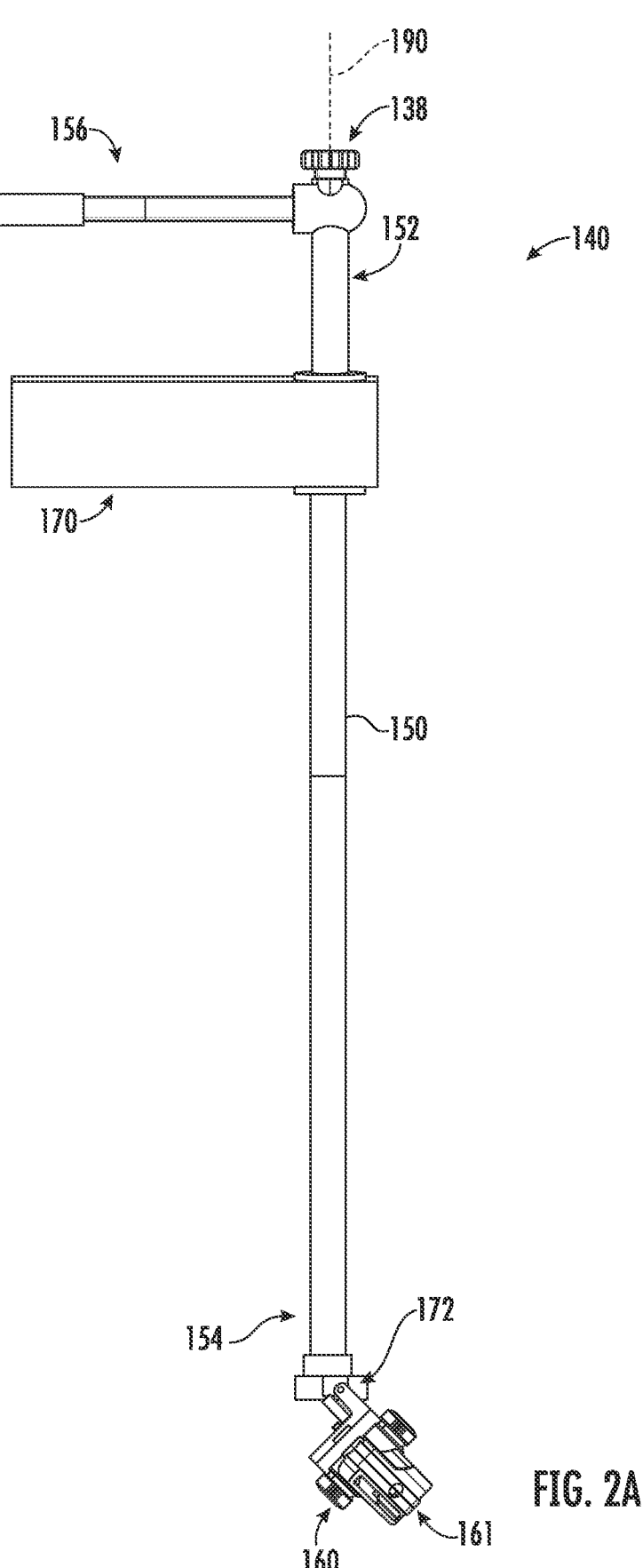
Figure 2B:
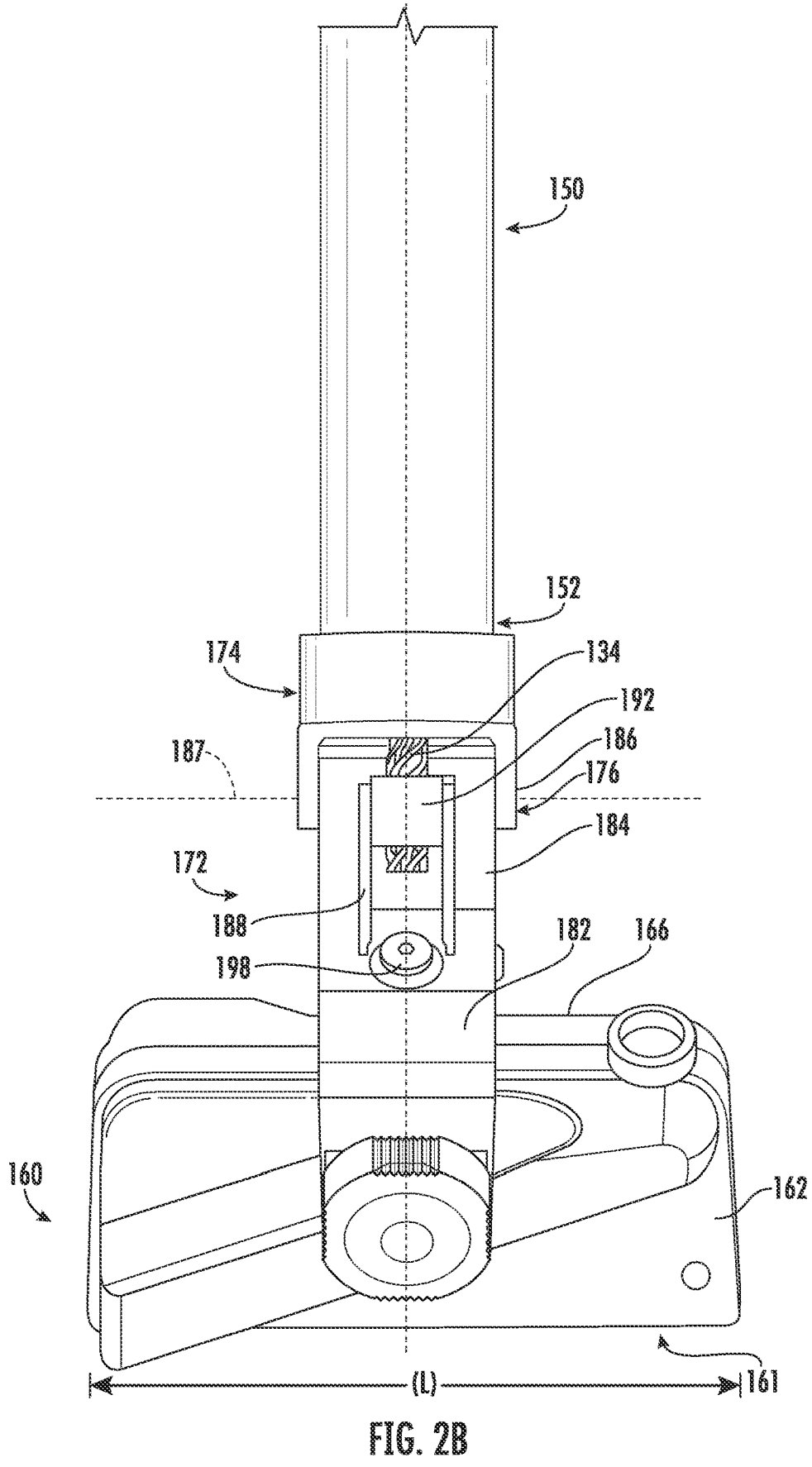
Figure 2C:
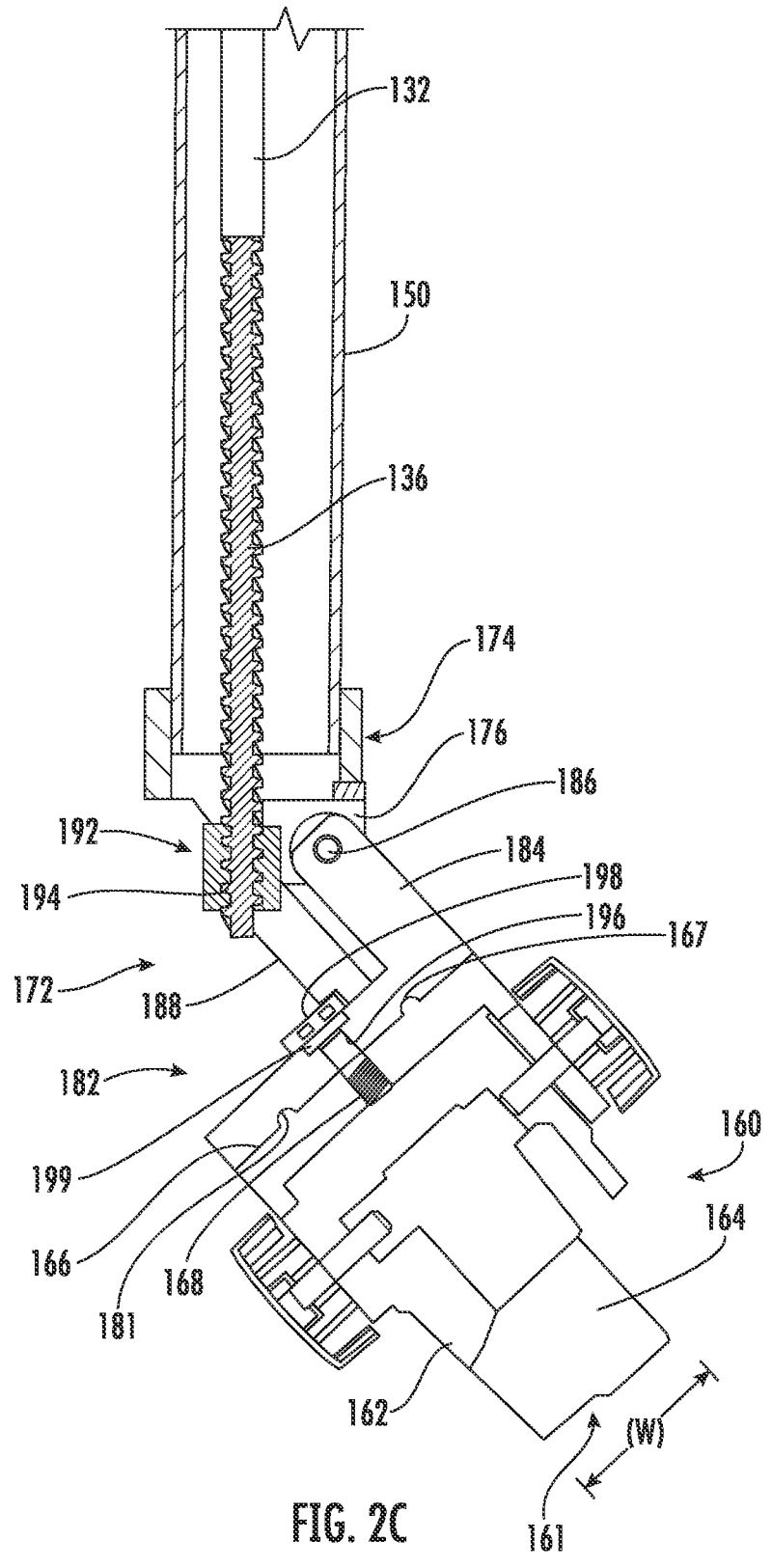
Figure 2D:
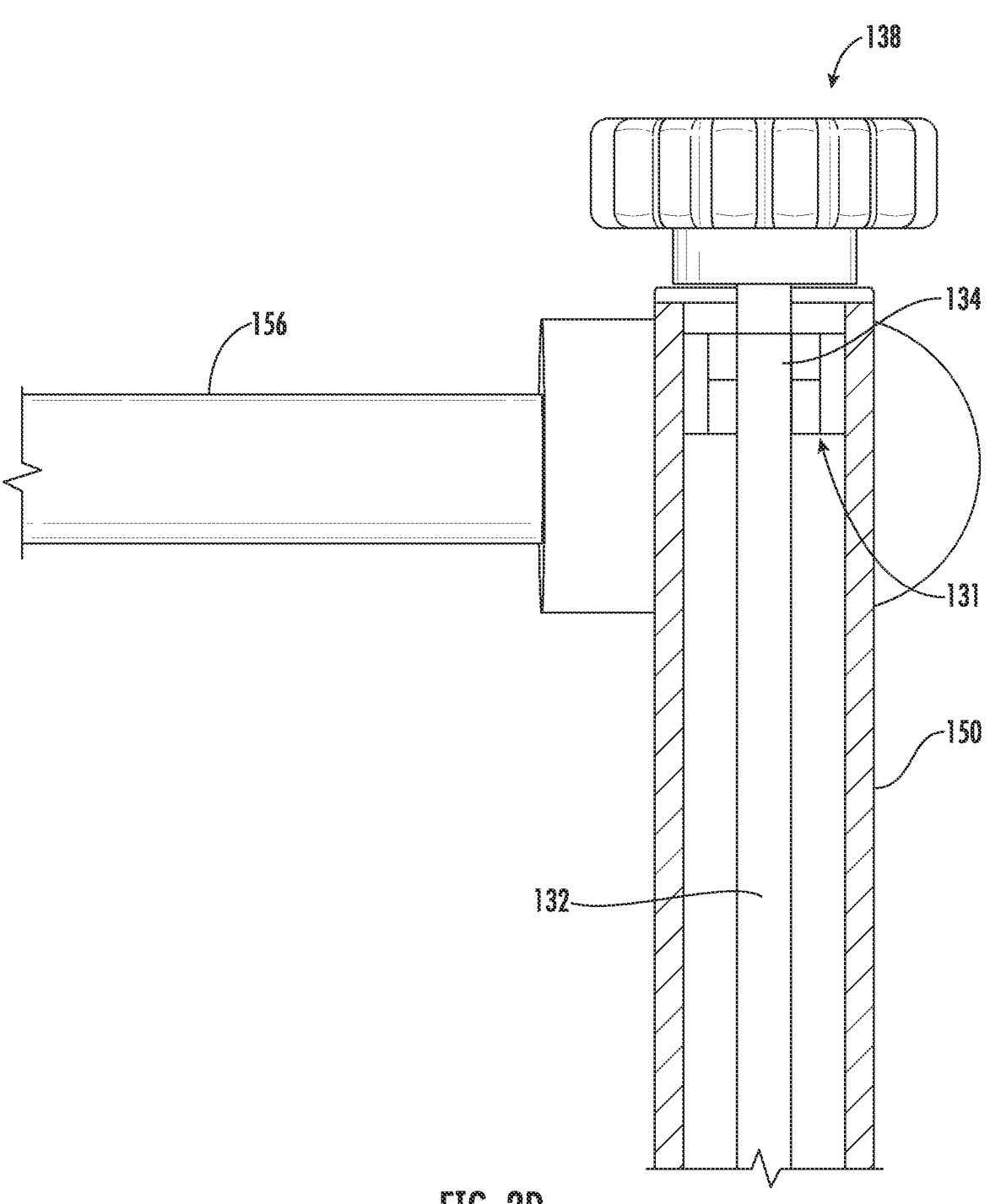

FIGS. 2A through 2D illustrate an example sonar assembly 140, according to some example embodiments. The sonar assembly 140 may include a shaft 150, a transducer assembly 160, and an attachment device 170. The sonar assembly 140 may be fixed either directly to a side, bow, or stern of a watercraft via an attachment device 170, which may be, for example, an adjustable clamp, or to the shaft of the trolling motor assembly 120. As shown, the shaft 150 may be hollow and include a steering handle 156 non-rotatably fixed to a top end 134 of the shaft 150. An adjustable bracket 172 may be non-rotatably fixed to a bottom end 154 of the shaft 150, the adjustable bracket 172 being utilized to secure the transducer assembly 160 to the shaft 150. Referring specifically to FIGS. 2C and 2D, a sonar tilt assembly may include an elongated rod 132 that is rotatably secured within the shaft 150 by a bushing 131 that is disposed within a top end 152 of the shaft 150. A control knob 138 may be non-rotatably fixed to the top end 134 of the rod 132, and may be used to rotate the rod 132 in either a clockwise direction or a counter-clockwise direction with respect to the shaft 150 (e.g., about a shaft axis), when viewed from above. A bottom end portion 136 of the rod 132 is threaded and may extend axially-outwardly beyond the bottom end 154 of the shaft 150.

Still referring to FIGS. 2B and 2C, the adjustable bracket 172 may include an end cap 174 that is non-rotatably fixed to the bottom end 154 of the shaft 150 and include two downwardly-depending projections that define a yoke 176. The bracket 172 may also include a base plate 182 that includes a mounting flange 184 extending outwardly from a back side of the base plate 182 such that the distal edge of the mounting flange 184 is received between the projections of the yoke 176. An axle 186 extends through both the projections defining the yoke 176 and the distal end of the mounting flange 184, thereby securing the base plate 182 to the end cap 174. The base plate 182 of the bracket 172 is pivotable with respect to the end cap 174 about the longitudinal center axis 187 of the axle 186.

As shown in FIGS. 2B and 2C, in the illustrated embodiment, a pair of projections extend outwardly from the rear face of the base plate 182, thereby forming a yoke 188. A collar 192 is secured between the distal ends of the projections of the yoke 188 so that the collar 192 is pivotable with respect to the yoke 188. The collar 192 defines a bore 194 that is correspondingly-threaded to the threaded bottom end portion 136 of the rod 132. The threaded bottom end portion 136 of the rod 132 is rotatably received within the threaded bore 194 of the collar 192 so that rotation of the bottom end portion 136 of the rod 132 within the collar 192 causes the collar 192 to move axially along the rod 132. In the illustrated embodiment, the threaded bottom end portion 136 of the rod 132 includes a standard right-hand thread, meaning that when viewed from above, rotation of the knob 138 in a clockwise direction causes the collar 192 to move upwardly along the rod 132. As best seen in FIG. 2C, upward movement of the collar 192 along the rod 132 causes the base plate 182 of the adjustable bracket 172 to rotate about the longitudinal center axis 187 of the axle 186 in a clockwise direction, meaning the transmission direction of the transducer assembly 160 moves downwardly away from the surface 101 of the water, as shown in FIGS. 9A and 10B. Conversely, rotation of the knob 138, when viewed from above, in the counter-clockwise direction causes collar 192 to move downwardly along the rod 132, meaning the base plate 182 of the adjustable bracket 172 rotates about the longitudinal center axis 187 of the axle 186 in the counter-clockwise direction. As such, as shown in FIG. 9B, the direction of transmission of the transducer assembly 160 will move closer to the surface 101 of the water. Note, in the illustrated embodiment, the direction of transmission of the transducer assembly 160 is movable from being parallel with respect to the surface of the water to being vertical with respect to the surface of the water, i.e., movable 90° vertically with respect to the watercraft (as shown in FIG. 10B).

As shown in FIGS. 2A and 2C, in the illustrated embodiment, the example transducer assembly 160 includes a housing 162 that houses one or more transducer arrays 164 and defines an emitting face 161 with a length (L) and a width (W), where the length is greater than the width. The housing 162 also includes a base wall 166 opposite to the emitting face 161 and is secured to a front face of the base plate 182 of the adjustable bracket 172. The base wall 166 of the housing 162 may be secured to the base plate 182 by a threaded fastener 198 that passes through a smooth bore 196 that extends through the base plate 182 and engages a threaded bore 168 that is defined in the base wall of the housing 162. The smooth bore 196 is configured so that the head of the threaded fastener is movable axially within a portion thereof. However, a spring 199 is disposed within the smooth bore 196 below the head of the threaded fastener 198 so that the spring 199 provides a biasing force on the threaded fastener 198, thereby urging the threaded fastener 198 axially-outwardly from the smooth bore 196. As such, the biasing force of the spring 199 helps to maintain the base wall 166 of the housing 162 of the transducer assembly 160 adjacent the base plate 182 of the adjustable bracket 172.

In some embodiments, the transducer assembly 160 can be configured to be oriented differently to provide different sonar image options. For example, as shown in FIGS. 2B, 2C, 10A, and 10B, the transducer assembly 160 may be configured to be oriented horizontally (such as pointing forward from the watercraft) and provide a desirable sonar image that is wide (e.g., widest) in the horizontal plane. This orientation is often referred to as being in "scout" mode. In this regard, the extended sonar beam coverage)(e.g., ~135° may be used to see a wider view in the port-to-starboard direction with respect to the watercraft 100 (or off to one side of the watercraft or both sides if two transducer assemblies are used). Note, in the illustrated embodiment, broader coverage in the port-to-starboard direction results in more narrow coverage)(e.g., ~20° in the fore-and-aft direction (FIG. 10B).

In the illustrated embodiment, a user may selectively configure the transducer assembly 160 to be oriented vertically (such as downwardly from the watercraft with the emitting face 161 disposed in a vertical plane) and provide a desirable sonar image that is wide (e.g., widest) in the vertical plane. This orientation is often referred to as being in the "down" or "normal" mode. In this regard, the more narrow sonar beam coverage)(e.g., ~20° may be used to see a more focused view in the port-to-starboard direction with respect to the watercraft, as shown in FIG. 11A. Conversely, in this orientation, the extended beam coverage)(e.g., ~135° is now provided in the fore-and-aft direction with respect to the watercraft 100, as shown in FIG. 11B.

Referring again to FIGS. 2B and 2C, to change the orientation of the transducer assembly 160 from the scout mode (FIGS. 10A and 10B) to the normal/down mode (FIGS. 11A and 11B), a user pulls outwardly on the transducer assembly 160 with enough force to overcome the biasing force of the spring 199 that maintains the transducer assembly 160 adjacent the base plate 182 of the adjustable bracket 172. Once the base wall 166 of the transducer assembly 160 is separated from the base plate 182 enough for detents 167 formed on the base wall 166 to clear corresponding recesses 181 formed on the base plate 182, the user is free to rotate the transducer assembly 160 to the desired orientation. The detents 167 and recesses 181 may be provided to ensure that the transducer assembly 160 is properly oriented with respect to the adjustable bracket 172 and maintained in that position until changed by the user. For example, for the scout mode in which the transducer assembly 160 is oriented horizontally, the length of the emitting face 161 of the transducer assembly 160 should be perpendicular to the steering handle 156 of the sonar assembly 140, whereas for the normal/down mode in which the transducer assembly 160 is oriented vertically, the length of the emitting face 161 of the transducer assembly 160 should be co-planar with the steering handle.

Figure 3A:
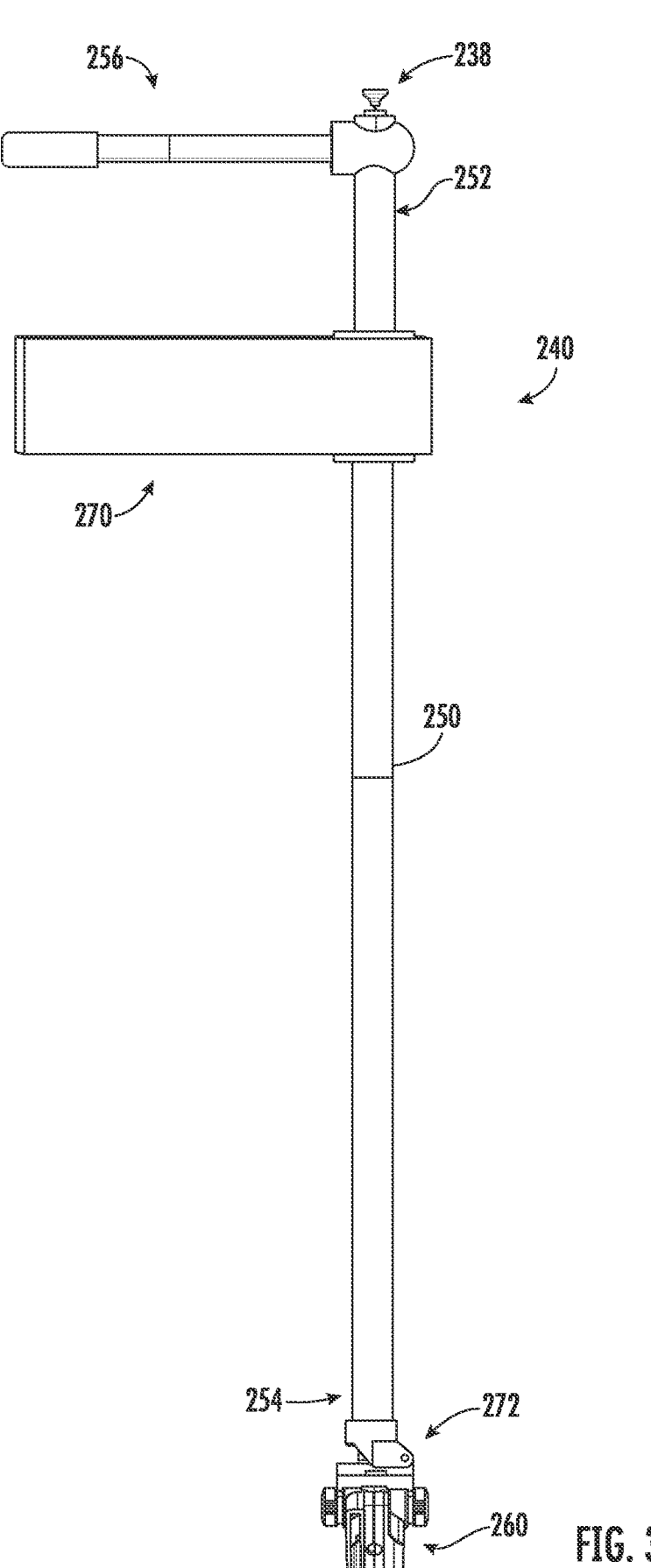
Figure 3B:
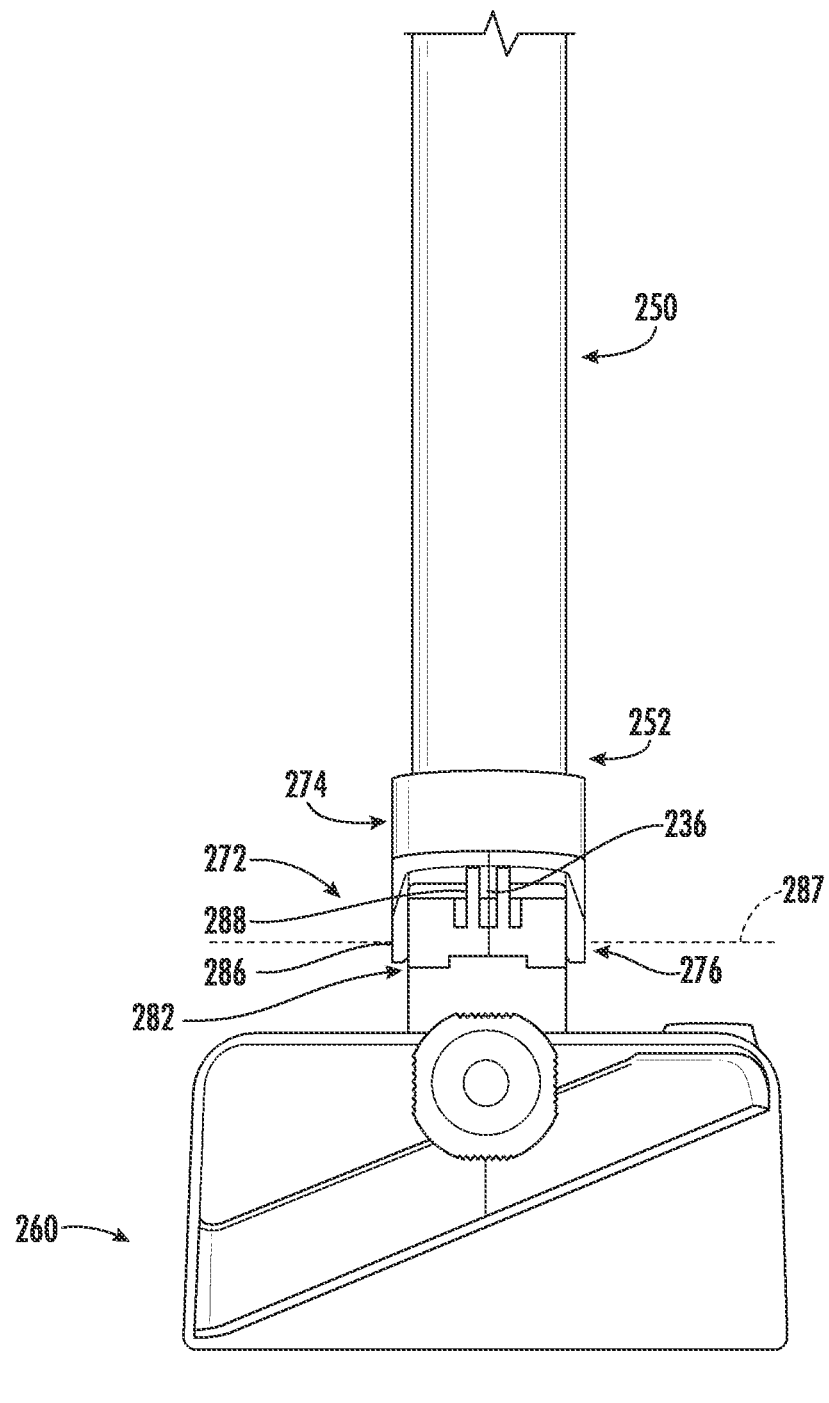
Figure 3C:
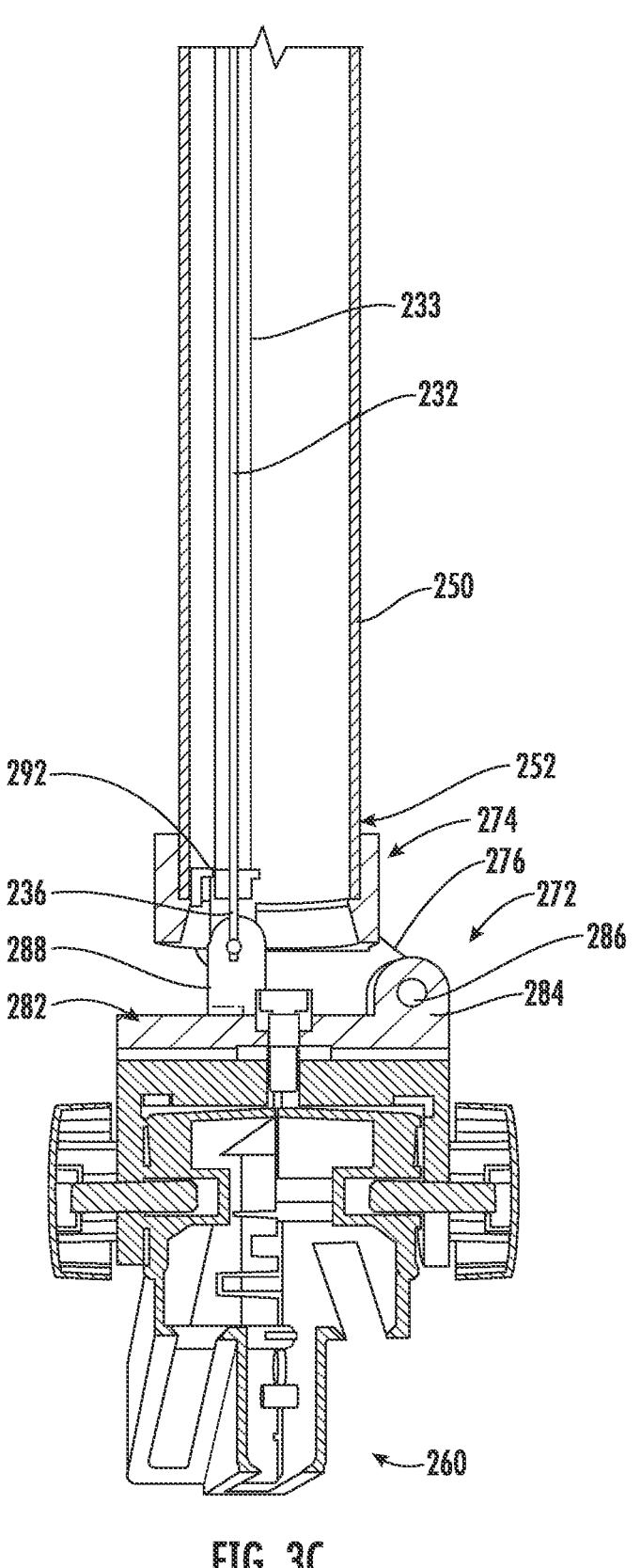
Figure 3D:
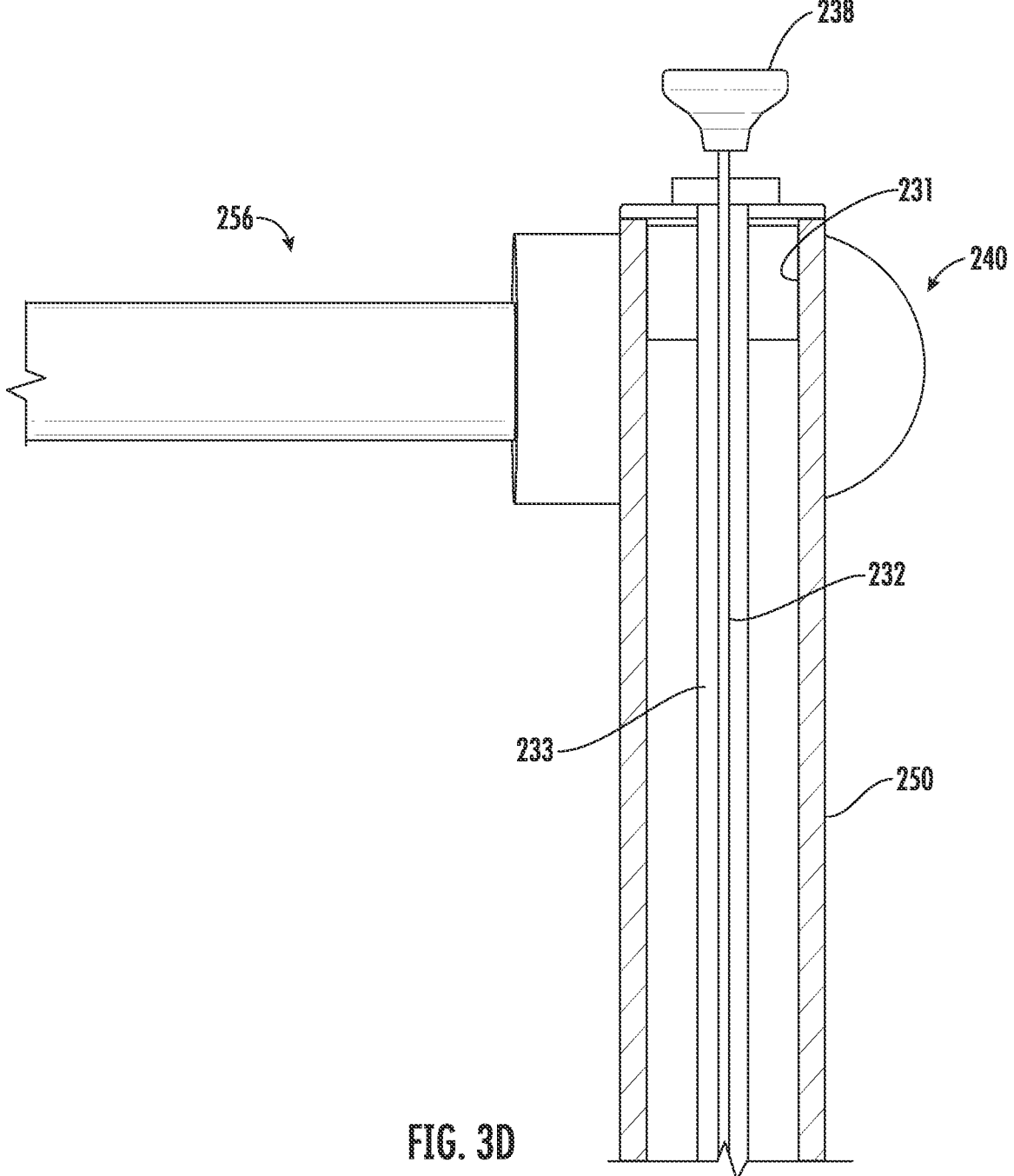

FIGS. 3A through 3D illustrate an alternate embodiment sonar assembly 240, according to some example embodiments. The sonar assembly 240 may include a shaft 250, a transducer assembly 260, and an attachment device 270. The sonar assembly 240 may be fixed to either a side, bow, or stern of a watercraft via an attachment device 270, which may be, for example, an adjustable clamp, or to the shaft of the trolling motor assembly. As shown, the shaft 250 may be hollow and include a steering handle 256 non-rotatably fixed to a top end 234 of the shaft 250. An adjustable bracket 272 may be non-rotatably fixed to a bottom end 254 of the shaft 250, the adjustable bracket 272 being utilized to secure the transducer assembly 260 to the shaft 250. Referring specifically to FIGS. 3C and 3D, a sonar tilt assembly may include an elongated semi-rigid cable 232 that is axially movable within a hollow sheath 233. Note, in other embodiments, the cable 232 may be either rigid or flexible, and the sheath 233 may be as well. The sheath 233 is secured at its top end within the shaft 250 by a bushing 231 that is disposed within a top end 252 of the shaft 250, and at its bottom end by a bracket 292 so that the sheath 233 does not move axially with respect to the shaft 250. A control knob 238 may be fixed to the top end 234 of the rod 232, and may be used to move the cable 232 axially within the sheath 233 and, therefore, axially within the shaft 250. A bottom end portion 236 of the cable 232 may extend axially-outwardly from the bottom end 254 of the shaft 250.

Referring now to FIGS. 3B and 3C, the adjustable bracket 272 may include an end cap 272 that is non-rotatably fixed to the bottom end 254 of the shaft 250 and include two downwardly-depending projections that define a yoke 276. The bracket 272 may also include a base plate 282 that includes a mounting flange 284 extending outwardly from a back side of the base plate 282 such that the distal edge of the mounting flange 284 is received between the projections of the yoke 276. An axle 286 extends through both the projections defining the yoke 276 and the distal end of the mounting flange 284, thereby securing the base plate 282 to the end cap 274. The base plate 282 of the bracket 272 is pivotable with respect to the end cap 274 about the longitudinal center axis 287 of the axle 286.

As shown in FIGS. 3B and 3C, in the illustrated embodiment, a pair of projections extend outwardly from the rear face of the base plate 282, thereby forming a yoke 288. The bottom end portion 236 of the cable 232 is secured between the distal ends of the projections of the yoke 288 so that moving the cable 232 axially with respect to the shaft 250 causes the base plate 282 of the adjustable bracket 272 to pivot about the longitudinal center axis 287 of the axle 286. As best seen in FIGS. 3C and 3D, downward movement of the control knob 238 causes the bottom end portion 236 to extend downwardly from the bottom end 254 of the shaft 250, thereby causing the base plate 282 of the adjustable bracket 272 to rotate about the longitudinal center axis 287 of the axle 286 in a counter-clockwise direction and the transmission direction of the transducer assembly 160 to move upwardly toward the surface 101 of the water, as shown in FIG. 9B. Conversely, upward movement of the control knob 238 causes the bottom end portion 236 to move upwardly toward the bottom end 254 of the shaft 250, thereby causing the base plate 282 of the adjustable bracket 272 to rotate about the longitudinal center axis 287 of the axle 286 in the clockwise direction and, therefore, the direction of transmission of the transducer assembly to move farther away to the surface 101 of the water, as shown in FIG. 9A.

Figure 4A:
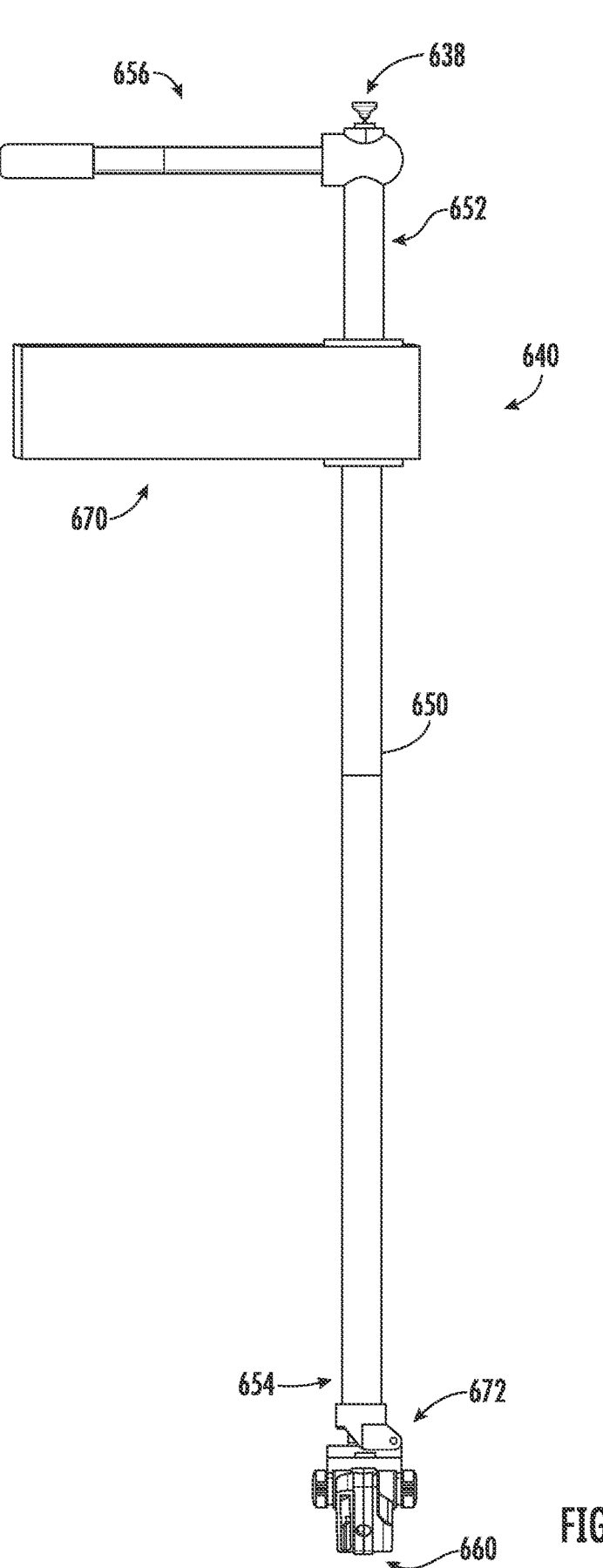
Figure 4B:
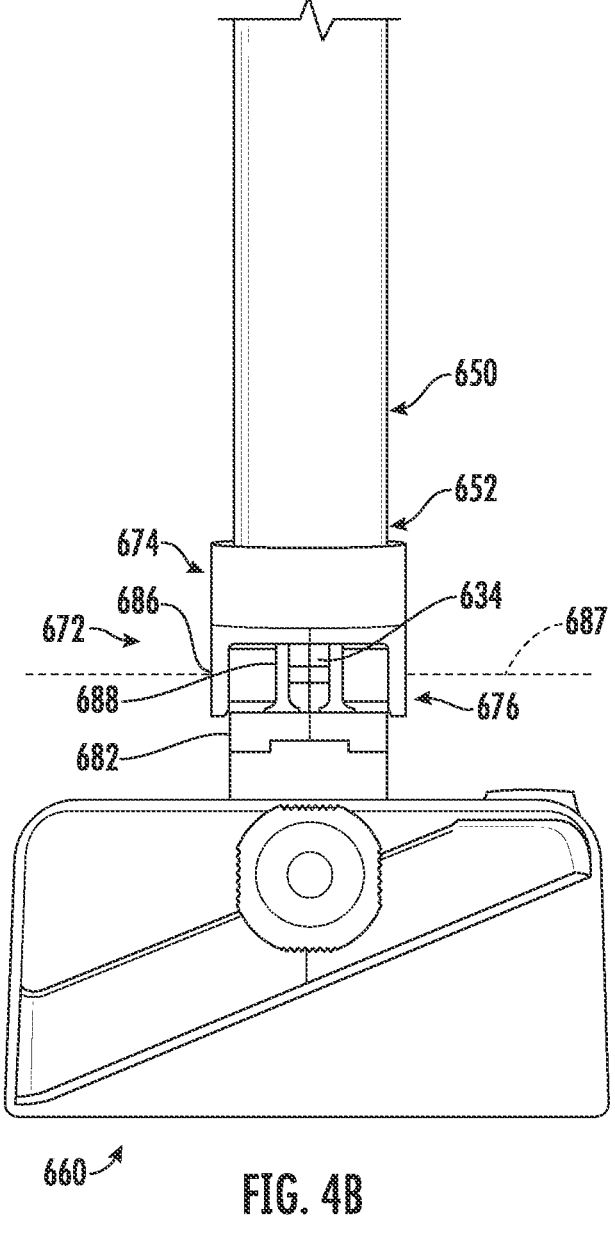
Figure 4C:
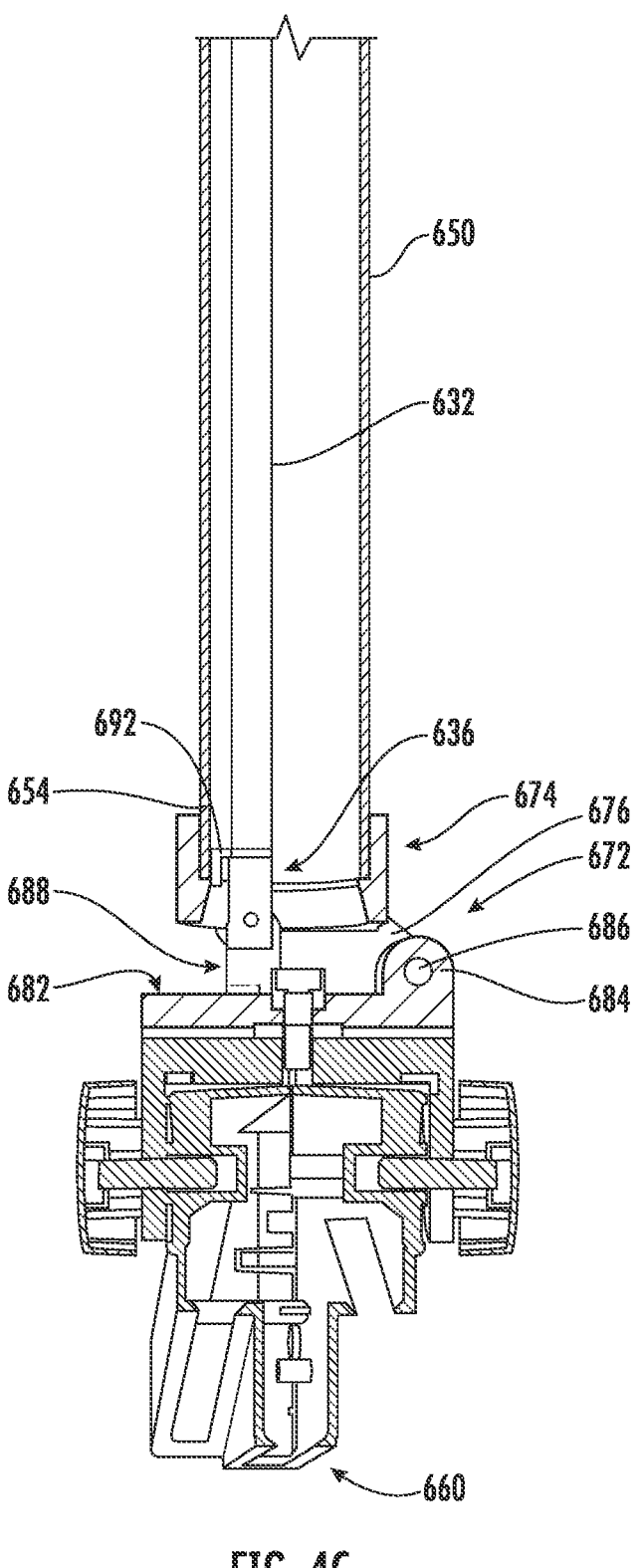
Figure 4D:
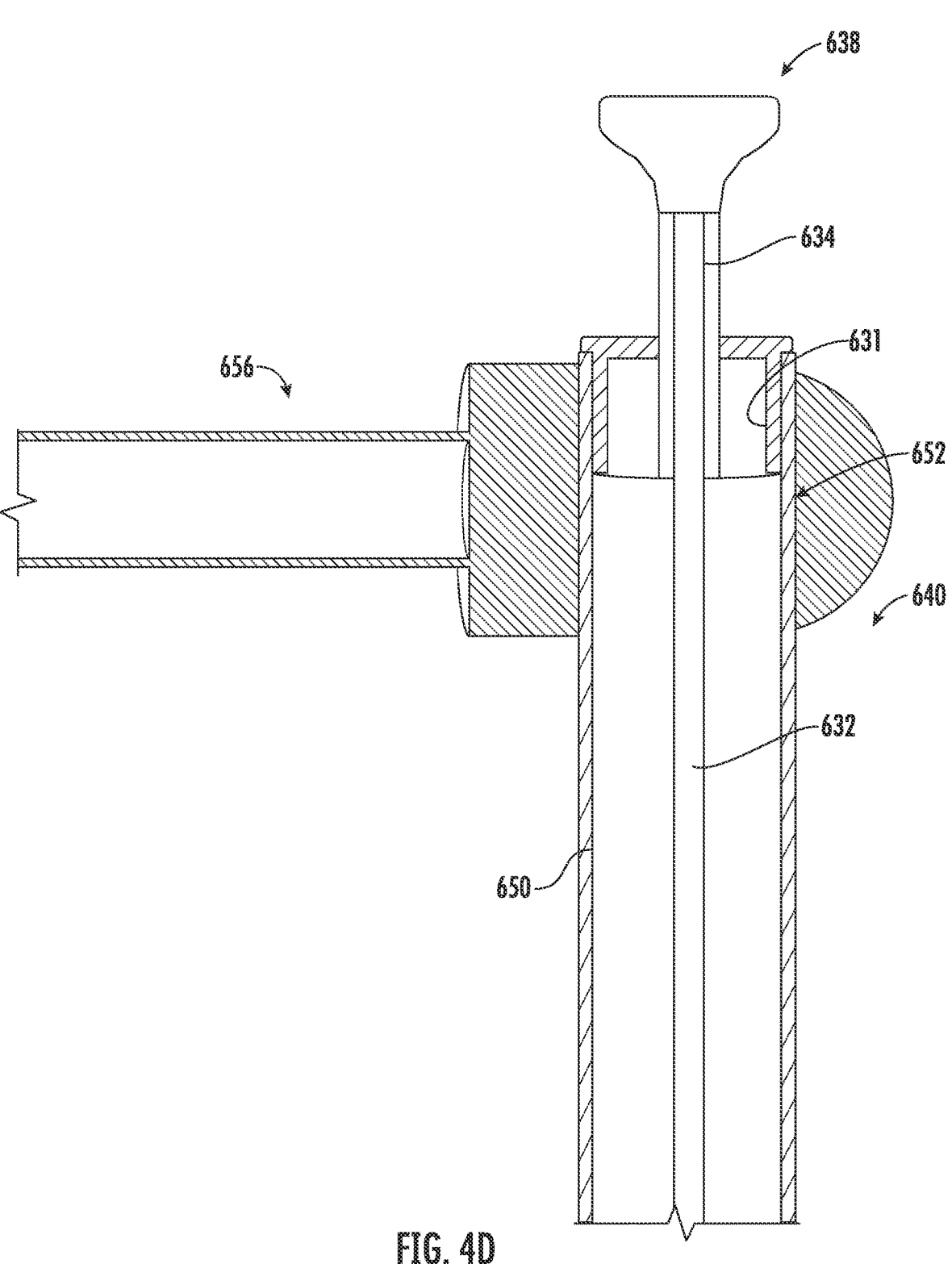

FIGS. 4A through 4D illustrate an alternate embodiment sonar assembly 640, according to some example embodiments. The sonar assembly 640 may include a shaft 650, a transducer assembly 660, and an attachment device 670. The sonar assembly 640 may be fixed to either a side, bow, or stern of a watercraft via an attachment device 670, which may be, for example, an adjustable clamp, or to the shaft of the trolling motor assembly. As shown, the shaft 650 may be hollow and include a steering handle 656 non-rotatably fixed to a top end 634 of the shaft 650. An adjustable bracket 672 may be non-rotatably fixed to a bottom end 654 of the shaft 650, the adjustable bracket 672 being utilized to secure the transducer assembly 660 to the shaft 650. Referring specifically to FIGS. 4C and 4D, a sonar tilt assembly may include an elongated rigid rod 632 that is axially movable within the hollow shaft 650. The rod 632 is secured at its top end within the shaft 650 by a bushing 631 that is disposed within a top end 652 of the shaft 650, and at its bottom end by a bracket 692. As shown, rod 632 is axially movable with respect to the shaft 650. A control knob 638 may be fixed to the top end 634 of the rod 632, and may be used to move the rod 632 axially within the shaft 650. A bottom end portion 636 of the rod 632 may extend axially-outwardly from the bottom end 654 of the shaft 650.

Referring now to FIGS. 4B and 4C, the adjustable bracket 672 may include an end cap 672 that is non-rotatably fixed to the bottom end 654 of the shaft 650 and include two downwardly-depending projections that define a yoke 676. The bracket 672 may also include a base plate 682 that includes a mounting flange 684 extending outwardly from a back side of the base plate 682 such that the distal edge of the mounting flange 684 is received between the projections of the yoke 676. An axle 686 extends through both the projections defining the yoke 676 and the distal end of the mounting flange 684, thereby securing the base plate 682 to the end cap 674. The base plate 682 of the bracket 672 is pivotable with respect to the end cap 674 about the longitudinal center axis of the axle 686.

As shown in FIGS. 4B and 4C in the illustrated embodiment, a pair of projections extend outwardly from the rear face of the base plate 682, thereby forming a yoke 688. The bottom end portion 636 of the rod 632 is secured between the distal ends of the projections of the yoke 688 so that moving the rod 632 axially with respect to the shaft 650 causes the base plate 682 of the adjustable bracket 672 to pivot about the longitudinal center axis of the axle 686. As best seen in FIGS. 4C and 4D, downward movement of the control knob 638 causes the bottom end portion 636 to extend downwardly from the bottom end 654 of the shaft 650, thereby causing the base plate 682 of the adjustable bracket 672 to rotate about the longitudinal center axis of the axle 686 in a counter-clockwise direction and the transmission direction of the transducer assembly 160 to move upwardly toward the surface 101 of the water, as shown in FIG. 9B. Conversely, upward movement of the control knob 638 causes the bottom end portion 636 to move upwardly toward the bottom end 654 of the shaft 650, thereby causing the base plate 682 of the adjustable bracket 672 to rotate about the longitudinal center axis of the axle 686 in the clockwise direction and, therefore, the direction of transmission of the transducer assembly to move farther away to the surface 101 of the water, as shown in FIG. 9A.

As shown in FIG. 5, according to some example embodiments, rather than the steering handle 156 shown in the embodiments of FIGS. 2A through 2D, 3A through 3D, and 4A through 4D, the sonar assembly may include a directional actuator 180 that is configured to actuate to cause rotation of the shaft 150 (FIGS. 2A through 2D), and accordingly rotation of the transducer assembly 160, about axis 190 (e.g., a shaft axis) to change the direction in a horizontal plane in which the transducer assembly 160 is directed with respect to the watercraft. To cause rotation and control of the orientation of the transducer assembly 160, the directional actuator 180 may directly rotate the shaft 150 on a series of cam shafts, or gears may be employed to cause the rotation. The directional actuator 180 may be controlled via signals transmitted to the directional actuator 180 from a sonar control device via a wireless connection 280. In other example embodiments, a wired connection 419 (FIG. 5A) may be utilized to convey signals to the directional actuator 180.

Additionally, according to some sample embodiments similar to the embodiment shown in FIGS. 2A through 2D, rather than the discussed control knob 138, the directional actuator 180 may also be configured to actuate to cause rotation of the rod 132 and, therefore, rotation of the transducer assembly 160 about the longitudinal center axis 187 of the axle 186 to change the direction in a vertical plane in which the transducer assembly 160 is directed with respect to the watercraft. To cause rotation and control of the orientation of the transducer assembly 160, the directional actuator 180 may directly rotate the rod 132 on a series of cam shafts, or gears may be employed to cause the rotation. The directional actuator 180 may be controlled via signals transmitted to the directional actuator 180 from a sonar-controlled device via a wireless connection 280. In other example embodiments, a wired connection 419 (FIGS. 7A-7B) may be utilized to convey signals to the directional actuator 180.

As well, according to some sample embodiments, rather than the control knobs 238 and 638 of the embodiments shown in FIGS. 3A through 3D, and 4A through 4D, the directional actuator 180 that is configured to actuate to cause rotation of the shafts 250 and 650 may also be configured to actuate to cause axial motion of the cable 232 and the rod 632, respectively, and accordingly rotation of the transducer assemblies about the axles 286 and 686 to change the direction in a vertical plane in which the transducer assemblies are directed with respect to the watercraft. To cause rotation and control of the orientation of the transducer assemblies, the directional actuator 180 may directly move the cable 232 and the rod 632 on a series of cam shafts, or gears may be employed to cause the linear motion. The directional actuator 180 may be controlled via signals transmitted to the directional actuator 180 from a sonar-control device via either a wireless or a wired connection.

FIG. 6 shows an example implementation of a user input assembly of a sonar control device according to various example embodiments in the form of a foot pedal assembly 400. The foot pedal assembly 400 may be one example of a user input assembly that includes a deflection sensor and a lever. The foot pedal assembly 400 may be in operable communication the sonar assembly 140, via, for example, the processor as described with respect to FIG. 12. Foot pedal assembly 400 includes a lever 410 in the form of a foot pedal 431 that can pivot about an axis, both fore-and-aft (as indicated by the arrows), and side-to-side, in response to movement of, for example, a user's foot. The foot pedal assembly 400 further includes a support base 420 and a deflection sensor 440. The deflection sensor 440 may measure the deflection of the foot pedal 410 and provide an indication of the deflection to, for example, a processor. A corresponding directional input signal having an indication of either a horizontal direction of turn, based on side-to-side deflection, or a vertical direction of turn, based on fore-and-aft deflection, may be ultimately provided to an actuator (e.g., directional actuator 315 of FIG. 12) via a wireless connection. In some embodiments, the user input assembly may determine whether to provide instructions for horizontal direction of turn or vertical direction of turn based on fore-and-aft deflection—e.g., depending on if a horizontal mode or a vertical mode is selected, such as via a button on the user input assembly.

According to some example embodiments, the measured deflection of the foot pedal 410 may be an indication of the desired vertical change in the transmission direction of the sonar assembly 140. In this regard, a user may cause the foot pedal 410 to rotate or deflect by an angle in the fore-and-aft direction (according to example coordinate system 432) and the angle may be measured (e.g., in degrees) by the deflection sensor 440. According to some example embodiments, rotation of the foot pedal 410 in the counterclockwise direction (such that the left side, or heel side, of the foot pedal is tilted down), as shown in FIG. 9B, may cause the orientation of the transducer assembly 160 of the sonar assembly 140 rotate vertically upwardly toward the surface 101 of the water, while rotation of the foot pedal 410 in the clockwise direction (such that the right side, or toe side, of the foot pedal is tilted down), as shown in FIG. 9A, may cause the orientation of the transducer assembly 160 to rotate vertically downwardly away from the surface 101 of the water.

As well, according to some example embodiments, the measured deflection of the foot pedal 410 may be an indication of the desired horizontal change in the transmission direction of the sonar assembly 140. In this regard, a user may cause the foot pedal 410 to rotate or deflect by an angle (according to example coordinate system 432) and the angle may be measured (e.g., in degrees) by the deflection sensor 440. According to some example embodiments, rotation of the left edge of the foot pedal 410 toward the base 420 (such that the left edge of the foot pedal is tilted down), may cause the orientation of the transducer assembly 160 of the sonar assembly 140 rotate toward the port side of the watercraft 100, while rotation of the right edge of the foot pedal 410 toward the base 420 (such that the right edge of the foot pedal is tilted down), may cause the orientation of the transducer assembly 160 to rotate toward the starboard side of the watercraft 100.

FIG. 8A provides another example user input assembly that includes a deflection sensor and a lever. A fob 500 may be an embodiment of a user input assembly that includes, for example, the processor 335 described with respect to FIG. 12. The fob 500 may include a horizontal rocker button 510 that pivots about an axis. The horizontal rocker button 510 may form the lever of some example embodiments and a deflection of the horizontal rocker button 510 may be measured by a deflection sensor (not shown). With respect to operation, a user may depress one side of the horizontal rocker button 510 to cause the horizontal rocker button 510 to deflect from its origin position. The angle of deflection may be measured by the deflection sensor and communicated to the processor as a direction of turn of the transducer assembly 160, such as to either port or starboard, within a horizontal plane with respect to the watercraft.

Additionally, the fob 500 may also include other controls, such as, a vertical rocker button 512 that may be operated to control the vertical orientation of the transducer assembly 160. Similarly to the horizontal rocker button 510, a user may depress either the front end or the rear end of the rocker button 512 to cause the vertical rocker button 512 to deflect from its original position. The angle of deflection may be measured by the deflection sensor and communicated to the processor as a direction of turn of the transducer assembly 160, such as either toward the surface or away from the surface of the water, within a vertical plane with respect to the watercraft.

Referring again to FIG. 6, in some embodiments, the foot pedal 410 may include pressure sensors 450 and 451 (e.g., in combination with or as an alternative to the deflection sensor 440) to determine a vertical orientation of the transducer assembly 160. Accordingly, as a user depresses the foot pedal 410 onto one of the pressure sensors 450 and 451, a pressure (or force) may be applied to the sensor and the sensor may measure the pressure. If pressure is applied to sensor 450, then a direction of turn in a first direction, such as toward the surface of the water, may be determined, and if pressure is applied to sensor 451, then a direction of turn in the opposite direction, such as away from the surface of the water, may be determined.

Additionally, another pair of pressure sensors (not shown) may be positioned one each on the left side edge and the right side edge of the base 420 of the foot pedal 410 (e.g., either in combination with or as an alternative to the deflection sensor 440) to determine a horizontal direction of turn of the transducer assembly 160. Accordingly, as a user depresses the foot pedal 410 onto either the left side edge pressure sensor or the right side edge pressure sensor, a pressure (or force) may be applied to the sensor and the sensor may measure the pressure. If pressure is applied to the left side edge sensor, then a direction of turn to port may be determined, and if pressure is applied to the right side edge sensor, then a direction of turn to starboard may be determined.

In a similar manner, rather than utilizing a horizontal rocker button 510 and vertical rocker button 512, as shown in FIG. 8A, pressure sensors may be used in conjunction with a fob 550 to detect pressure in order to determine a direction of turn. Along these lines, the fob 550 shown in FIG. 8B may use pressure sensors to determine a direction of turn in both the horizontal and vertical directions with respect to the watercraft. In this regard, fob 550 may be similar to fob 500, with the exception that rather than rocker buttons, two separate push buttons may be included for each omitted rocker button. For example, push buttons 560 and 570 may replace the horizontal rocker button 510, and push buttons 580 and 590 may replace vertical rocker button 512. One or more pressure sensors may be operably coupled to each push buttons to detect pressure being applied to the buttons. Again, pressure may be detected and used to determine a direction of turn, in both the horizontal and the vertical directions with respect to the watercraft, by the processor 335 (FIG. 12).

Referring again to FIG. 6, in some embodiments, switches may be used rather than pressure sensors. In such an example embodiment, as a user depresses the foot pedal 410 onto a switch, the switch may transition to an active state, thereby causing the transducer assembly 160 to rotate in the corresponding direction. In a similar manner, switches may be used in conjunction with the fob 500 and detection of an active state on either end of the horizontal rocker switch 510 may be used to determine a direction of turn. Switches may also be used with fob 550, such as through buttons 560, 570, 580, and 590 in a similar manner.

While the above example embodiments utilize sensors that measure angle of deflection and pressure, some embodiments of the present invention contemplate other types of sensors for correlating to a desired direction of turn (e.g., capacitive, among others). Further, while the above example embodiments utilize a foot pedal or fob, some embodiments of the present invention contemplate use with other systems/structures, such as a touch screen, a remote marine electronics device, a graphic user interface on a remote device (e.g., a cell phone, table, laptop, etc.). An example graphic user interface for a remote device such as a cell phone or a laptop could be similar in appearance to the fobs 500 and 550 described above.

FIG. 12 shows a block diagram of a sonar assembly 380 (similar to the sonar assembly 140) in communication with a sonar control device 330. As described herein, it is contemplated that while certain components and functionalities of components may be shown and described as being part of the sonar assembly 380 or the sonar control device 330, according to some example embodiments, some components (e.g., functionalities of the processors 305 and 335, or the like) may be included in the others of the sonar assembly 380, the sonar control device 330, or one or more remote devices.

As depicted in FIG. 12, the sonar assembly 380 may include a processor 305, a memory 310, a directional actuator 315, a communications interference 325, and a transducer array 327.

The processor 305 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 305 as described herein. In this regard, the processor 305 may be configured to analyze electrical signals communicated thereto in the form of a directional input signal, and instruct the directional actuator 315 to rotate the transducer array 327 in accordance with a received rotational signal.

The memory 310 may be configured to store instructions, computer program code, trolling motor steering codes and instructions, sonar steering codes and instructions marine data, such as sonar data, chart data, location/position data, and other data in a non-transitory computer readable medium for use, such as by the processor 305.

The communication interface 325 may be configured to enable connection to external systems. In this manner, the processor 305 may retrieve stored data from remote external servers via the communication interface 325, in addition to or as an alternative to the memory 310.

The processor 305 of the sonar assembly 380 may be in communication with and control the directional actuator 315. Directional actuator 315 may be an electronically controlled mechanical actuator (i.e., an electro-mechanical actuator) configured to actuate at various rates (or speeds) in response to respective signals or instructions. As described above with respect to directional actuator 180 (FIG. 5), directional actuator 315 may be configured to rotate the shaft and, therefore, transducer array 327, regardless of the means for doing so, in response to electrical signals. Similarly, the directional actuator 315 may be configured to either rotate the rod 132 (FIGS. 2A through 2D) or move the rod 232 and 632 axially (FIGS. 3A through 3D and FIGS. 4A through 4D), regardless of the means for doing so in response to electrical signals. To do so, directional actuator 315 may employ a solenoid, a motor, or the like configured to convert an electrical signal into a mechanical movement. The range of motion to turn the transducer array 327 may be 360 degrees, 180 degrees, 90 degrees, 37 degrees, or the like, in a horizontal plane and up to 90 degrees in a vertical plane.

The sonar assembly 380 may include a sonar transducer array 327 that may be fixed to a watercraft, such that the transducer array 327 is disposed underwater. In this regard, the transducer array 327 may be in a housing and configured to gather sonar data from the underwater environment surrounding the watercraft. Accordingly, the processor 305 (such as through execution of computer program code) may be configured to receive sonar data from the transducer array 327, and process the sonar data to generate an image based on the gathered sonar data. In some example embodiments, the sonar assembly 380 may be used to determine depth and bottom topography, detect fish, locate wreckage, etc. Sonar beams, from the sonar transducer 327, can be transmitted into the underwater environment and echoes can be detected to obtain information about the environment. In this regard, the sonar signals can reflect off objects in the underwater environment (e.g., fish, structures, sea floor bottom, etc.) and return to the transducer, which converts the sonar returns into sonar data that can be used to produce an image of the underwater environment. According to some example embodiments, the sonar assembly 380 may include or be in communication with a display to render the image for display to a user.

As mentioned above, the sonar assembly 380 may be in communication with a sonar control device 330 that is configured to selectively control the operation of the sonar assembly 380. In this regard, the sonar control device 330 may include a processor 335, a memory 340, a communication interface 345, and a user input assembly 350.

The processor 335 may be any means configured to execute various programmed operations or instructions stored in a memory device, such as a device or circuitry operating in accordance with software or otherwise embodied in hardware, or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 335 as described herein. In this regard, the processor 335 may be configured to analyze signals from the user input assembly 350 and convey the signals or variants of the signals, via the communication interface 345 to the sonar assembly 380.

The memory 340 may be configured to store instructions, computer program code, trolling motor steering codes and instructions, marine data, such as sonar data, chart data, location/position data, and other data in a non-transitory computer readable medium for use, such as by the processor 335.

The communication interface 345 may be configured to enable connection to external systems (e.g., communication interface 325). In this manner, the processor 335 may retrieve stored data from a remote, external server via the communication interface 345 in addition to, or as an alternative to, the memory 340.

Communication interfaces 325 and 345 may be configured to communicate via a number of different communication protocols and layers. For example, the link between the communication interfaces 325 and communication interface 345 may be any type of wireless communication link. For example, communications between the interfaces may be conducted via Bluetooth, Ethernet, the NMEA 2000 framework, cellular, WiFi, or other suitable networks.

According to various example embodiments, the processor 335 may operate on behalf of the sonar assembly 380 and the sonar control device 330. In this regard, the processor 335 may be configured to perform some or all of the functions described with respect to processor 305, and processor 335 may communicate directly to the directional actuator 315 directly via a wireless communication.

The processor 335 may also interface with the user input assembly 350 to obtain information including a direction of turn for the sonar assembly 380 based on user activity that are one or more inputs to the user input assembly 350. In this regard, the processor 335 may be configured to determine the direction of turn based on user activity detected by the user input assembly 350, and generate a directional input signal. The directional input signal may be an electrical signal indicating the direction of turn.

Various example embodiments of a user input assembly 350 may be utilized to detect the user activity and facilitate generation of an input signal indicating a direction of turn. To do so, various sensors including feedback sensors, and mechanical devices that interface with the sensors, may be utilized. For example, a deflection sensor 355, a pressure sensor 365, a switch 366, or a graphic user interface of a remote device may be utilized to detect user activity with respect to a direction of turn. Further, lever 360 and push button 370 may be mechanical devices that are operably coupled to a sensor and may interface directly with a user to facilitate inputting either a direction of turn by the user via the user input assembly 350. For example, a user may manipulate one of lever 360 and push button 370 to determine whether sonar control device provides control signals to rotate the transducer array 327 of the sonar assembly 380 either in a horizontal or a vertical plane.

According to some example embodiments, a deflection sensor 355 and a lever 360 may be utilized as the user input assembly 350. The deflection sensor 355 may be any type of sensor that can measure an angle of deflection of an object, for example, a lever 360 from a center or zero position. In this regard, the processor 335 may be configured to determine a transmission direction based on an angle of deflection (e.g., from a set point or origin) of the lever 360 measured by the deflection sensor 355. For example, as a user changes the angle of deflection, for example, from an origin, a change in the direction of transmission for the sonar assembly 140 is determined.

According to some embodiments, rather than using techniques that measure an angle of deflection, a pressure sensor 365 may be used in conjunction with, for example, either the lever 360 or a push button 370 to determine a direction of turn. In this regard, the pressure sensor 365 may be configured to detect an amount of pressure applied on the pressure sensor by a user and provide a pressure indication to the processor 335 based on the pressure. In turn, the processor 335 may be configured to determine a direction of turn based on the indication of applied pressure.

According to some example embodiments, a direction of turn may be determined based on a duration of time that a switch, such as switch 366, is in an active position. In this regard, switch 366 may have two states an active state (e.g., "on") and an inactive state (e.g., "off"). According to some example embodiments, switch 366 may normally be in the inactive state and user activity, such as actuation of the lever 360 or the push button 370, may be required to place the switch 366 in the active state. When in the active state, the active state may be detected and the direction of turn may be a indicated by the active state.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A sonar assembly for a watercraft, comprising:
an elongated shaft having a top end and a bottom end, and defining a bore that extends from the top end to the bottom end of the elongated shaft;
a transducer assembly secured to the bottom end of the elongated shaft, the transducer assembly having a facing direction and an emitting face of the facing direction, wherein the emitting face is defined by a length and a width and wherein the length of the emitting face is greater than the width of the emitting face;
an elongated member having a top end and a bottom end, the elongated member being disposed within the bore of the elongated shaft, the bottom end of the elongated member being operatively connected to the transducer assembly such that movement of the elongated member with respect to the elongated shaft causes rotation of the facing direction of the transducer assembly within a vertical plane with respect to the watercraft; and
an adjustable bracket including a base plate that is pivotably secured to the bottom end of the elongated shaft, wherein the base plate is configured to secure the transducer assembly in at least one of two different fixed orientations, wherein the transducer assembly is secured to the adjustable bracket such that the facing direction of the transducer assembly is rotatable with respect to two different axes that are perpendicular to each other to transition between the two different fixed orientations without detachment of the transducer assembly from the adjustable bracket, wherein rotation of the facing direction of the transducer assembly within the vertical plane with respect to the watercraft is distinct from the transition between the two different fixed orientations that is rotatable with respect to two different axes that are perpendicular to each other, wherein the two different fixed orientations includes a first orientation and a second orientation, wherein, when the transducer assembly is in the first orientation, the length of the emitting face is perpendicular to the length of the emitting face when the transducer assembly is in the second orientation.

2. The sonar assembly of claim 1, wherein axial movement of the elongated member with respect to the elongated shaft rotates the facing direction of the transducer assembly within the vertical plane with respect to the watercraft.

3. The sonar assembly of claim 1, wherein axial movement of the elongated member within the elongated shaft causes the base plate to pivot with respect to the elongated shaft.

4. The sonar assembly of claim 3, wherein the top end of the elongated member extends axially-outwardly beyond the top end of the elongated shaft.

5. The sonar assembly of claim 4, wherein the elongated member is one of a semi-rigid cable or a rigid rod.

6. The sonar assembly of claim 1, wherein rotation of the elongated member with respect to the elongated shaft rotates the facing direction of the transducer assembly within the vertical plane with respect to the watercraft.

7. The sonar assembly of claim 6, wherein the base plate has a yoke defined by two projections extending outwardly therefrom, and a collar defining a threaded bore, the collar being pivotably secured between the two projections defining the yoke, wherein the bottom end of the elongated member includes a threaded portion, the threaded portion being rotatably received within the threaded bore of the collar, wherein rotation of the elongated member with respect to the elongated shaft causes the threaded collar to move axially along the threaded portion of the elongated member.

8. The sonar assembly of claim 1, wherein the transducer assembly is attached to the elongated shaft such that rotation of the elongated shaft about a shaft axis causes rotation of the facing direction of the transducer assembly in a horizontal plane.

9. The sonar assembly of claim 1, wherein the transducer assembly is biased to a position adjacent to the base plate, wherein rotation of the facing direction of the transducer assembly relative to the base plate between the two different fixed orientations is prevented when the transducer assembly is in the position adjacent to the base plate, and wherein a user is able to pull the transducer assembly away from the position adjacent to the base plate to enable rotation of the facing direction of the transducer assembly between the two different fixed orientations.

10. An assembly for a watercraft, comprising:

an elongated shaft having a top end and a bottom end, and defining a bore that extends from the top end to the bottom end of the elongated shaft;

a bracket secured to the bottom end of the elongated shaft for mounting a transducer assembly thereon, the transducer assembly having a facing direction and an emitting face of the facing direction, wherein the emitting face is defined by a length and a width and wherein the length of the emitting face is greater than the width of the emitting face;

wherein the bracket further includes a base plate that is pivotably secured to the bottom end of the elongated shaft, wherein the base plate is configured to secure the transducer assembly in at least one of two different fixed orientations, and wherein the transducer assembly is secured to the bracket such that the facing direction of the transducer assembly is rotatable with respect to two different axes that are perpendicular to each other to transition between the two different fixed orientations without detachment of the transducer assembly from the bracket, wherein the two different fixed orientations includes a first orientation and a second orientation, wherein, when the transducer assembly is in the first orientation, the length of the emitting face is perpendicular to the length of the emitting face when the transducer assembly is in the second orientation; and an elongated member having a top end and a bottom end, the elongated member being disposed within the bore of the elongated shaft, the bottom end of the elongated member being operatively connected to the bracket such that movement of the elongated member with respect to the elongated shaft rotates the bracket within a vertical plane with respect to the watercraft, wherein rotation of the bracket within the vertical plane causes corresponding rotation of the facing direction of the transducer assembly mounted thereto within the vertical plane, wherein rotation of the facing direction of the transducer assembly within the vertical plane with respect to the watercraft is distinct from the transition between the two different fixed orientations that is rotatable with respect to two different axes that are perpendicular to each other.

11. The assembly of claim 10, wherein axial movement of the elongated member with respect to the elongated shaft rotates the bracket within the vertical plane with respect to the watercraft.

12. The assembly of claim 10, wherein the transducer assembly is secured to the base plate, and axial movement of the elongated member within the elongated shaft causes the base plate to pivot with respect to the elongated shaft.

13. The assembly of claim 12, wherein the top end of the elongated member extends axially-outwardly beyond the top end of the elongated shaft.

14. The assembly of claim 13, wherein the elongated member is one of a semi-rigid cable or a rigid rod.

15. The assembly of claim 10, wherein rotation of the elongated member with respect to the elongated shaft rotates the bracket within the vertical plane with respect to the watercraft.

16. The assembly of claim 15, wherein the base plate has a yoke defined by two projections extending outwardly therefrom, and a collar defining a threaded bore, the collar being pivotably secured between the two projections defining the yoke, wherein the bottom end of the elongated member includes a threaded portion, the threaded portion being rotatably received within the threaded bore of the collar, and wherein rotation of the elongated member with respect to the elongated shaft causes the threaded collar to move axially along the threaded portion of the elongated member.

17. The assembly of claim 10, wherein the transducer assembly is attached to the elongated shaft such that rotation of the elongated shaft about a shaft axis causes rotation of the bracket such that the facing direction of the transducer assembly rotates in a horizontal plane.

18. The assembly of claim 17, wherein the transducer assembly is biased to a position adjacent to the base plate, wherein rotation of the facing direction of the transducer assembly relative to the base plate between the two different fixed orientations is prevented when the transducer assembly is in the position adjacent to the base plate, and wherein a user is able to pull the transducer assembly away from the position adjacent to the base plate to enable rotation of the facing direction of the transducer assembly between the two different fixed orientations.

19. The sonar assembly of claim 1, wherein, when the transducer assembly is in the first orientation, the length of the emitting face is co-planar with the elongated member, and wherein, when the transducer assembly is in the second orientation, the length of the transducer is perpendicular to the elongated member.

20. The assembly of claim 10, wherein, when the transducer assembly is in the first orientation, the length of the emitting face is co-planar with the elongated member, and wherein, when the transducer assembly is in the second orientation, the length of the transducer is perpendicular to the elongated member.

* * * * *